US012762280B2

(12) United States Patent
Bernau et al.

(10) Patent No.: US 12,762,280 B2
(45) Date of Patent: Oct. 13, 2026

(54) INTERPRETABILITY FRAMEWORK FOR DIFFERENTIALLY PRIVATE DEEP LEARNING

(71) Applicant: SAP SE, Walldorf (DE)

(72) Inventors: Daniel Bernau, Karlsruhe (DE); Philip-William Grassal, Walldorf (DE); Hannah Keller, Walldorf (DE); Martin Haerterich, Wiesloch (DE)

(73) Assignee: SAP SE, Walldorf (DE)

( * ) Notice: Subject to any disclaimer, the term of this patent is extended or adjusted under 35 U.S.C. 154(b) by 49 days.

(21) Appl. No.: 18/904,462

(22) Filed: Oct. 2, 2024

(65) Prior Publication Data

US 2025/0036811 A1 Jan. 30, 2025

Related U.S. Application Data

(62) Division of application No. 18/581,254, filed on Feb. 19, 2024, now Pat. No. 12,147,577, which is a
(Continued)

(51) Int. Cl.
*G06F 21/62* (2013.01)
*G06F 17/18* (2006.01)
(Continued)

(52) U.S. Cl.
CPC .......... *G06F 21/6254* (2013.01); *G06F 17/18* (2013.01); *G06F 18/2148* (2023.01); *G06N 20/00* (2019.01)

(58) Field of Classification Search
CPC .. G06F 17/18; G06F 21/6245; G06F 21/6254; G06N 20/00; G06N 3/08
See application file for complete search history.

(56) References Cited

U.S. PATENT DOCUMENTS 12,001,588 B2 6/2024 Bernau et al.
2018/0004978 A1* 1/2018 Hebert ................ G06F 16/2457
(Continued)

OTHER PUBLICATIONS

"U.S. Appl. No. 17/086,244, Examiner Interview Summary mailed Nov. 8, 2023", 2 pgs.
(Continued)

*Primary Examiner* — Olugbenga O Idowu
(74) *Attorney, Agent, or Firm* — SCHWEGMAN LUNDBERG & WOESSNER, P.A.

(57) ABSTRACT

Data is received that specifies a bound for an adversarial posterior belief $\rho_c$ that corresponds to a likelihood to re-identify data points from the dataset based on a differentially private function output. Privacy parameters ε, δ are then calculated based on the received data that govern a differential privacy (DP) algorithm to be applied to a function to be evaluated over a dataset. The calculating is based on a ratio of probabilities distributions of different observations, which are bound by the posterior belief $\rho_c$ as applied to a dataset. The calculated privacy parameters are then used to apply the DP algorithm to the function over the dataset. Related apparatus, systems, techniques and articles are also described.

20 Claims, 14 Drawing Sheets

Related U.S. Application Data division of application No. 17/086,244, filed on Oct. 30, 2020, now Pat. No. 12,001,588.

(51) Int. Cl.

| | |
|---|---|
| ***G06F 18/214*** | (2023.01) |
| ***G06N 20/00*** | (2019.01) |

(56) References Cited

U.S. PATENT DOCUMENTS

| | | | | |
|---|---|---|---|---|
| 2019/0238516 | A1 | 8/2019 | Weggenmann et al. | |
| 2021/0360010 | A1* | 11/2021 | Zaccak | G06N 20/20 |
| 2022/0067505 | A1 | 3/2022 | Liu et al. | |
| 2022/0138348 | A1 | 5/2022 | Bernau et al. | |
| 2024/0211635 | A1 | 6/2024 | Bernau et al. | |

OTHER PUBLICATIONS

"U.S. Appl. No. 17/086,244, Non Final Office Action mailed Aug. 9, 2023", 11 pgs.
"U.S. Appl. No. 17/086,244, Notice of Allowance mailed Nov. 21, 2023", 8 pgs.
"U.S. Appl. No. 17/086,244, Response filed May 17, 2023 to Restriction Requirement mailed Mar. 17, 2023", 8 pgs.
"U.S. Appl. No. 17/086,244, Response filed Nov. 9, 2023 to Non Final Office Action mailed Aug. 9, 2023", 11 pgs.
"U.S. Appl. No. 17/086,244, Restriction Requirement mailed Mar. 17, 2023", 5 pgs.
"U.S. Appl. No. 18/581,254, Notice of Allowance mailed Sep. 11, 2024", 9 pgs.
"Differential privacy and the secrecy of the sample", Oddly Shaped Pegs, Online. Retrieved <https://adamdsmith.wordpress.com/2009/09/02/sample-secrecy/>, (2009), 1-4.
Abadi, Martin, et al., "Deep Learning with Differential Privacy", Proceedings of the ACM SIGSAC Conference on Computer and Communications Security, (2016), 14 pgs.
Beimel, et al., "Bounds on the Sample Complexity for Private Learning and Private Data Release", (2014), 1-18.
Bernau, Daniel, et al., "Assessing differentially private deep learning with Membership Inference", arXiv preprint arXiv:1912.11328v4, (2020), 17 pgs.
Dwork, et al., "Boosting and Differential Privacy", 2010 IEEE 51st Annual Symposium on Foundations of Computer Science, IEEE Computer Society, (2010), 51-60.
Dwork, et al., "Concentrated Differential Privacy", arXiv: 1603.01887[cs.DS], (Mar. 16, 2016), 1-28.
Dwork, et al., "Our Data, Ourselves: Privacy via Distributed Noise Generation", (2006), 1-18.
Dwork, Cynthia, "Differential Privacy", ICALP. Lecture Notes in Computer Science, vol. 4052, (2006), 1-12.
Dwork, Cynthia, et al., "The Algorithmic Foundations of Differential Privacy", Foundations and Trends in Theoretical Computer Science, vol. 9, Nos. 3-4, 211-407, (2014), 281 pgs.
Eibl, et al., "The influence of differential privacy on short term electric load forecasting", Energy Informatics, 1(Suppl 1) 48, (2018), 93-113.
Hsu, et al., "Differential Privacy: An Economic Method for Choosing Epsilon", arXiv: 1402.3329 [cs.DB], (Feb. 13, 2014), 1-29.
Kalrouz, et al., "The Composition Theorem for Differential Privacy", Proceedings of the 32nd International Conference on Machine Learning, Lille, France, Jmlr: W&Cp, vol. 37, (2015), 10 pgs.
Lee, et al., "Differential Identifiability", KDD'12, Beijing, China, (Aug. 12-16, 2012), 1041-1049.
Lee, et al., "How Much Is Enough? Choosing e for Differential Privacy", Springer-Verlag Berlin Heidelberg, (2011), 325-340.
Li, et al., "Membership Privacy: A Unifying Framework for Privacy Definitions", CCS'13, Berlin, Germany, (Nov. 4-8, 2013), 13 pgs.
Li, et al., "On Sampling, Anonymization, and Differential Privacy: Or, k-Anonymization Meets Differential Privacy", arxiv.org/abs/1101.2604v2, (2011), 1-12.
Lyubashevsky, et al., "On Ideal Lattices and Learning with Errors Over Rings", (2013), 1-34.
Mahalanobis, "On the Generalized Distance in Statistics", Joum. Asiat. Soc. Bengal, (1936), 49-55.
Mardia, et al., "Multivariate Analysis", Academic Press Limited, London, (1979), 1-518.
Mcmahan, et al., "Learning Differentially Private Recurrent Language Models", arXiv: 1710.06963v3, (Feb. 24, 2018), 1-14.
Nissim, K., et al., "Smooth Sensitivity and Sampling in Private Data Analysis", Proceedings of the Thirty-Ninth Annual ACM Symposium on Theory of Computing, [Online]. Retrieved from the Internet: <http://www.cse.psu.edu/~sxr48/pubs/smooth-sensitivity-stoc.pdf>, (Jun. 11-13, 2007), 75-84.
Samarati, et al., "Protecting Privacy when Disclosing Information: k-Anonymity and Its Enforcement through Generalization and Suppression", (1998), 19 pgs.
Shokri, Reza, et al., "Membership Inference Attacks Against Machine Learning Models", arXiv:1610.05820v2, (2017), 16 pgs.
Thakkar, et al., "Differentially Private Learning with Adaptive Clipping", arXiv: 1905.03871vl, (May 9, 2019), 1-9.

* cited by examiner (a) β(·) for MGau

100a (b) β(·) for MLaP

100b (a) Decision boundary based on PDFs

200a (b) Decision boundary based on confidence

200b

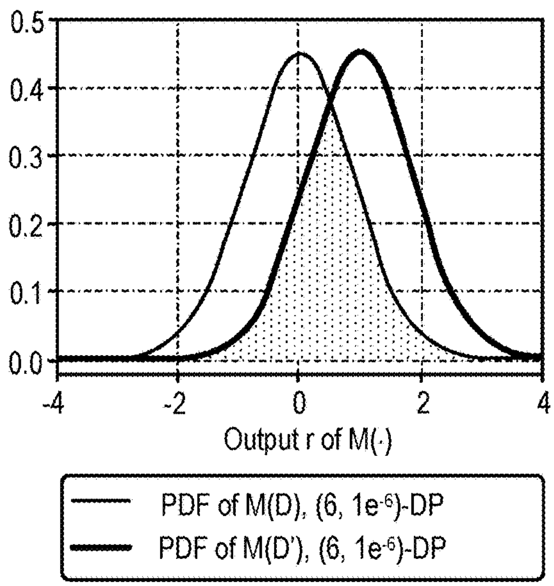
(a) Error regions (6, 1e-6)-DP
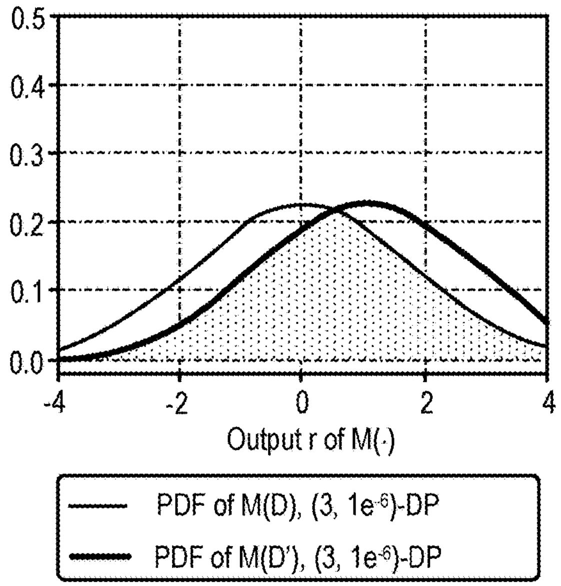
(b) Error regions (3, 1e-6)-DP
300a
300b
FIG. 3A
FIG. 3B

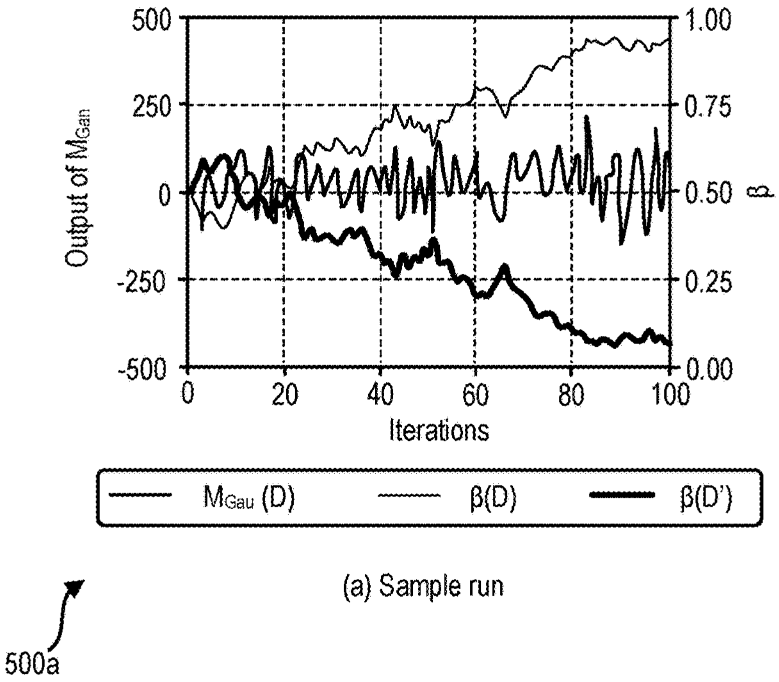
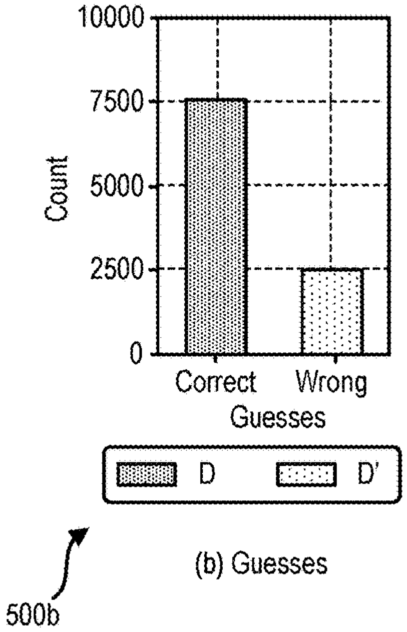
FIG. 5A
FIG. 5B (a) ε = 1.10,pc(1.10,0.01) = 0.75

(b) ε = 2.20,pc(2.20,0.01) = 0.90

(c) ε = 2.94,pc(2.94,0.01) = 0.95

(d) ε = 4.60,pc(4.60,0.01) = 0.99

(a) $\Delta f_2 = S(f_\theta)$, Bounded DP (b) Global, Bounded DP (c) $\Delta f_2 = S(f_\theta)$, Unbounded DP (b) Global, Unbounded DP (a) MAE over ϵ with △f = 48.

(b) MAE over ϵ with △f = S(f ) = 15.36.

INTERPRETABILITY FRAMEWORK FOR DIFFERENTIALLY PRIVATE DEEP LEARNING

PRIORITY CLAIM

This application is a divisional of prior application Ser. No. 18/581,254, filed on Feb. 19, 2024, which is a divisional of prior application Ser. No. 17/086,244, filed on Oct. 30, 2020, which applications are incorporated by reference herein in their entireties.

TECHNICAL FIELD

The subject matter described herein relates to an interpretability framework for calculating confidence levels and expected membership advantages of an adversary in identifying members of a training dataset used with training machine learning models.

BACKGROUND

Machine learning models can leak sensitive information about training data. To address such situations, noise can be added during the training process via differential privacy (DP) to mitigate privacy risk. To apply differential privacy, data scientists choose DP parameters ($\in$, δ). However, interpreting and choosing DP privacy parameters ($\in$, δ), and communicating the factual guarantees with regard to re-identification risk and plausible deniability is still a cumbersome task for non-experts. Different approaches for justification and interpretation of DP privacy parameters have been introduced which stray from the original DP definition by offering an upper bound on privacy in face of an adversary with arbitrary auxiliary knowledge.

SUMMARY

In a first aspect, data is received that specifies a bound for an adversarial posterior belief $\rho_c$ that corresponds to a likelihood to re-identify data points from the dataset based on a differentially private function output. Privacy parameters ε, δ are then calculated based on the received data that govern a differential privacy (DP) algorithm to be $\rho_c$ on a conditional probability of different possible datasets on a ratio of probabilities distributions of different observations, which are bound by the posterior belief $\rho_c$ as applied to a dataset. The calculated privacy parameters are then used to apply the DP algorithm to the function over the dataset.

The probability distributions can be generated using a Gaussian mechanism with an (ε, δ) guarantee that perturbs the result of the function evaluated over the dataset, preventing a posterior belief greater than $\rho_c$ on the dataset.

The probability distributions can be generated using a Laplacian mechanism with an e guarantee that perturbs the result of the function evaluated over the dataset, preventing a posterior belief greater than $\rho_c$ on the dataset.

The resulting dataset (i.e., the dataset after application of the DP algorithm to the function over the dataset) can be used for various applications including training a machine learning model. Such a trained machine learning model can be deployed and then classify data input therein.

Privacy parameter $\in$ can equal $\log(\rho_c/(1-\rho_c)$ for a series of (ε, δ) or ε anonymized function evaluations with multi-dimensional data.

A resulting total posterior belief $\rho_c$ can be calculated using a sequential composition or Rényi differential privacy (RDP) composition. The at least one machine learning model can be updated using the calculated resulting total posterior belief $\rho_c$.

In an interrelated aspect, data is received that specifies privacy parameters ε, δ which govern a differential privacy (DP) algorithm to be applied to a function to be evaluated over a dataset. The received data is then used to calculate an $\rho_\alpha$[OBJ] $\rho_\alpha$[OBJ] can be used when applying the DP algorithm to a function over the dataset.

The probability distributions can be generated using a Gaussian mechanism with an (ε,δ) guarantee that perturbs the result of the function evaluated over the dataset, ensuring that membership advantage is $\rho_\alpha$ on the dataset.

The probability distributions can be generated using a Laplacian mechanism with an ε guarantee that perturbs the result of the function evaluated over the dataset, ensuring that membership advantage is $\rho_\alpha$ on the dataset.

The resulting dataset (i.e., the dataset after application of the DP algorithm to the function over the dataset) can be used to train at least one machine learning. Such a trained machine learning model can be deployed so as to classify further data input therein.

The calculated expected membership advantage $\rho_\alpha$ for a series of (ε, δ) anonymized function evaluations with multidimensional data is equal to:

$$CDF\left(\frac{1}{\frac{2\sqrt{2\ln\left(\frac{1.25}{\delta}\right)}}{\epsilon}}\right) - CDF\left(\frac{-1}{\frac{2\sqrt{2\ln\left(\frac{1.25}{\delta}\right)}}{\epsilon}}\right)$$

wherein CDF is the cumulative distribution function of the standard normal distribution.

A resulting expected membership advantage $\rho_\alpha$ can be calculated using sequential composition or Rényi differential privacy (RDP) composition. The calculated resulting expected membership advantage $\rho_\alpha$ can be used to update the at least one machine learning model.

In a further interrelated aspect, data is received that specify privacy parameters ε, δ which govern a differential privacy (DP) algorithm to be applied to a function to be evaluated over a dataset. Thereafter, the received data is used to calculate an adversarial posterior belief bound $\rho_c$ that corresponds to a likelihood to re-identify data points from the dataset based on a differentially private function output. Such calculating can be based on an overlap of two probability distributions. The DP algorithm can then be applied, using the calculated adversarial posterior belief bound $\rho_c$, to a function over the dataset to result in an anonymized function output (e.g., machine learning model, etc.).

Posterior belief bound $\rho_c$ can equal $1/(1+e^{-\in})$ for a series of (ε, δ) or ε anonymized function evaluations with multi-dimensional data.

Data can be received that specifies an expected adversarial posterior belief bound expected $\rho_c$ such that $\rho_c$=expected $\rho_c$+δ*(1−expected $\rho_c$).

The probability distributions can be generated using a differential privacy mechanism either with an (ε, δ) guarantee or with an ε guarantee that perturbs the result of the function evaluated over the dataset, preventing a posterior belief greater than $\rho_c$ on the dataset.

At least one machine learning model can be anonymously trained using the resulting dataset (i.e., the dataset after application of the DP algorithm to the function over the dataset). A resulting total posterior belief $\rho_c$ can be calculated using a sequential composition or Rényi differential privacy (RDP) composition. The at least one machine learning model can be updated using the calculated resulting total posterior belief $\rho_c$.

In a still further interrelated aspect, a dataset is received. Thereafter, at least one first user-generated privacy parameter is received which governs a differential privacy (DP) algorithm to be applied to a function evaluated over the received dataset. Using the received at least one first user-generated privacy parameter, at least one second privacy parameter is calculated based on a ratio or overlap of probabilities of distributions of different observations. Thereafter, the DP algorithm is applied, using the at least one second privacy parameter, to the function over the received dataset to result in an anonymized function output (e.g., machine learning model, etc.). At least one machine learning model can be anonymously trained using the dataset which, when deployed, is configured to classify input data.

The machine learning model(s) can be deployed once trained to classify input data when received.

The at least one first user-generated privacy parameter can include a bound for an adversarial posterior belief $\rho_c$ that corresponds to a likelihood to re-identify data points from the dataset based on a differentially private function output. With such an arrangement, the calculated at least one second privacy parameter can include privacy parameters $\varepsilon$, $\delta$ and the calculating can be based on a ratio of probabilities distributions of different observations which are bound by the posterior belief $\rho_c$ as applied to the dataset.

In another variation, the at least one first user-generated privacy parameter includes privacy parameters $\varepsilon$, $\delta$. With such an implementation, the calculated at least one second privacy parameter can include an expected membership advantage $\rho_\alpha$ that corresponds to a probability of an adversary successfully identifying a member in the dataset and the calculating can be based on an overlap of two probability distributions.

In still another variation, the at least one first user-generated privacy parameter can include privacy parameters $\varepsilon$, $\delta$. With such an implementation, the $\rho_c$[OBJ] that corresponds to a likelihood to re-identify data points from the dataset based on a differentially private function output and the calculating can be based on an overlap of two probability distributions.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current framework provides enhanced techniques for selecting a privacy parameter $\in$ based on the re-identification confidence $\rho_c$ and expected membership advantage $\rho_\alpha$. These advantages were demonstrated on synthetic data, reference data and real-world data in a machine learning and data analytics use case which show that the current framework is suited for multidimensional queries under composition. The current framework furthermore allows the optimization of the utility of differentially private queries at the same ($\rho_c$, $\rho_\alpha$) by considering the sensitive range $S(f)$ instead of global sensitivity $\Delta f$. The framework allows data owners and data scientists to map their expectations of utility and privacy, and derive the consequent privacy parameters $\in$.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 3A and 3B are diagrams illustrating $\mathcal{A}_{adapt}$ error regions for varying $\varepsilon$, $\mathcal{M}_{Gau}$, $f(\mathcal{D})=0$, $f(\mathcal{D}')=1$;

FIGS. 5A and 5B are diagrams illustrating a sample run of $\mathcal{A}_{adapt}$ on a sequence of k=100 evaluations of $\mathcal{M}_{Gau_i}$ that shows the mechanism outputs on the left y-axis and the development of confidences on $\mathcal{D}$ and $\mathcal{D}'$ on the right-hand y-axis. At the $\mathcal{A}$[OBJ]$_{adapt}$ decides for the dataset with the highest confidence. In 5(*b*), the number of decisions for overall runs are shown.

Like reference symbols in the various drawings indicate like elements.

DETAILED DESCRIPTION

Figure 1A:
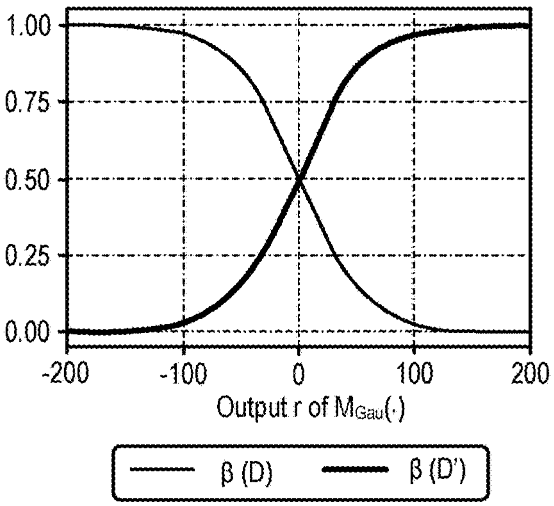
FIGS. 1A and 1B are diagrams respectively illustrating posterior beliefs over an output space of $\mathcal{M}_{Gau}$ and $\mathcal{M}_{Lap}$.

Provided herein is an interpretability framework for calculating the confidence $\rho_c$ and expected membership advantage $\rho_a$ of an adversary in identifying members of training data used in connection with one or machine learning models. These metrics are derived a priori for multidimensional, iterative computations, as found in machine learning. The framework is compatible with composition theorems and alternative differential privacy definitions like Renyi Differential Privacy, offering a tight upper bound on privacy. For illustration purposes, the framework and resulting utility is evaluated on synthetic data, in a deep learning reference task, and in a real-world electric load forecasting benchmark.

The current subject matter provides a generally applicable framework for interpretation of the DP guarantee in terms of an adversary's confidence and expected membership advantage for identifying the dataset on which a differentially private result was computed. The framework adapts to various DP mechanisms (e.g., Laplace, Gaussian, Exponential) for scalar and multidimensional outputs and is well-defined even under composition. The framework allows users to empirically analyze a worst-case adversary under DP, but also gives analytical bounds with regard to maximum confidence and expected membership advantage.

The current subject matter, in particular, can be used to generate anonymized function output within specific privacy parameter bounds which govern the difficulty of getting insight into the underlying input data. Such anonymous function evaluations can be used for various purposes including training of machine learning models which, when deployed, can classify future data input into such models.

Also provided herein, are illustrations of how different privacy regimes can be determined by the framework independent of a specific use case.

Still further, with the current subject matter, privacy parameters for abstract composition theorems such as Renyi Differential Privacy in deep learning can be inferred from the desired confidence and membership advantage in our framework.

Differential Privacy. Generally, data analysis can be defined as the evaluation of a function $f$. DOM→R on some dataset $\mathcal{D} \in$ DOM yielding a result $r \in$ R. Differential privacy is a mathematical definition for anonymized analysis of datasets. In contrast to previous anonymization methods based on generalization (e.g., k-anonymity), DP perturbs the result of a function $f(\cdot)$ over a dataset $\mathcal{D}=\{d_1, \ldots, d_n\}$ s.t. it is no longer possible to confidently determine whether $f(\cdot)$ was evaluated on $\mathcal{D}$ or some neighboring dataset $\mathcal{D}'$ differing in one individual. The neighboring dataset $\mathcal{D}'$ can be created by either removing one data point from $\mathcal{D}$ (unbounded DP) or by replacing one data point in $\mathcal{D}$ with another from DOM (bounded DP). Thus, privacy is provided to participants in the dataset since their impact of presence (absence) on the query result becomes negligible. To inject differentially private noise into the result of some arbitrary function $f(\cdot)$, mechanisms $\mathcal{M}$ fulfilling Definition 1 are utilized.

Definition 1 (($\epsilon$, $\delta$)-Differential Privacy). A mechanism $\mathcal{M}$ gives ($\epsilon$, $\delta$)-Differential Privacy if for all $\mathcal{D}$, $\mathcal{D}' \subseteq$DOM differing in at most one element, and all outputs S⊆R $$Pr(\mathcal{M}(\mathcal{D}) \in S) \leq e^{\epsilon} \cdot Pr(\mathcal{M}(\mathcal{D}') \in S) + \delta$$

$\epsilon$-DP is defined as ($\epsilon$, $\delta$=0)-DP and refer to the application of a mechanism $\mathcal{M}$ to a function $f(\cdot)$ as output perturbation. DP holds if mechanisms are calibrated to the global sensitivity i.e., the largest influence a member of the dataset can cause to the outcome of any $f(\cdot)$. Let $\mathcal{D}$ and $\mathcal{D}'$ be neighboring datasets, the global $\ell_1$-sensitivity of a function $f$ is defined as $\Delta f = \max_{\mathcal{D},\mathcal{D}'} \|f(\mathcal{D}) - f(\mathcal{D}')\|_1$. Similarly, $\Delta f_2 = max_{\mathcal{D},\mathcal{D}'} \|f(\mathcal{D}) - f(\mathcal{D}')\|_2$ can be referred to as global $\ell_2$-sensitivity.

A popular mechanism for perturbing the outcome of numerical query functions $f$ is the Laplace mechanism. Following Definition 1 the Laplace mechanism adds noise calibrated to $\Delta f$ by drawing noise from the Laplace distribution with mean μ=0.

Theorem 1 (Laplace Mechanism). Given a numerical query functions $f$: DOM→$\mathbb{R}^k$, the Laplace mechanism $$\mathcal{M}_{Lap}(\mathcal{D}, f, \epsilon) := f(\mathcal{D}) + (z_1, \ldots, z_k)$$

is an $\epsilon$-differentially private mechanism when all $z_i$ with 1≤i≤k are independently drawn from $$\mathcal{Z} \sim Lap\left(z, \lambda = \frac{\Delta f}{\epsilon}\mu\right) = 0.$$

A second DP mechanism used for output perturbation within this work is the Gaussian mechanism of Definition 2. The Gaussian mechanism uses $\ell_2$-sensitivity.

Theorem 2 (Gaussian Mechanism). Given a numerical query function $f$: DOM→$\mathbb{R}^k$, it exists σs. t. the Gaussian mechanism $$\mathcal{M}_{Gau}(\mathcal{D}, f, \epsilon, \delta) := f(\mathcal{D}) + (z_1, \ldots, z_k)$$

is an ($\epsilon$, $\delta$)-differentially private mechanism for a given pair of $\epsilon$, $\delta \in (0, 1)$ when all $z_i$ with 1≤i≤k are independently drawn from $\mathcal{Z} \sim N(0, \sigma^2)$.

Prior work has analyzed the tails of the normal distributions and found that bounding $\sigma > \Delta f_2 \sqrt{2\ln(1.25/\delta)}/\epsilon$ fulfills Theorem 2. However, these bounds have been shown to be loose and result in overly pessimistic noise addition.

Definition 2 (($\alpha$, $\epsilon_{RDP}$)-Differential Privacy). A mechanism $\mathcal{M}$ gives ($\alpha$, $\epsilon_{RDP}$)-RDP if for any adjacent $\mathcal{D}$, $\mathcal{D}' \subseteq$DOM and α>1

$$\mathcal{D}_\alpha(\mathcal{M}(\mathcal{D}) \| \mathcal{M}(\mathcal{D}')) = \frac{1}{\alpha - 1} \ln \mathbb{E}_{x \sim \mathcal{M}(\mathcal{D}')} \left( \frac{\mathcal{M}(\mathcal{D})}{\mathcal{M}(\mathcal{D}')} \right)^{\alpha} \leq \epsilon_{RDP}$$

Calibrating the Gaussian mechanism in terms of Rényi differential privacy (RDP) is straight forward due to the relation $\epsilon_{RDP} = \alpha \cdot \Delta f_2^2 / 2\sigma^2$. One option is to split $\sigma = \Delta f_2 * \eta$ where η is called noise multiplier which is the actual term dependent on $\epsilon_{RDP}$ as $\Delta f_2$ is fixed. A (α, RDP)-RDP guarantee converts to $$\left(\epsilon_{RDP} - \frac{\ln\delta}{\alpha - 1}, \delta\right) - DP$$

which is not trivially invertible as multiple (α, $\epsilon_{RDP}$) yield the same (∈, δ)-DP guarantee. A natural choice is to search for a (α, $\epsilon_{RDP}$) causing α to be as low as possible. Hence, it can be expanded as follows:

$$\epsilon = \epsilon_{RDP} - \frac{\ln\delta}{\alpha - 1} = \alpha \cdot \Delta f_2^2 / 2\sigma^2 - \frac{\ln\delta}{\alpha - 1} = \alpha / 2\eta^2 - \frac{\ln\delta}{\alpha - 1}$$

and minimize $$\eta = \min_{\alpha} \sqrt{\alpha / 2(\epsilon + (\ln\delta)/(\alpha - 1))}$$

which provides a tight bound on η and thus on σ for given (∈, δ).

The standard approach to analyze the privacy decay over a series of ∈-DP mechanisms is the sequential composition theorem.

Theorem 3 (Sequential Composition). Let $\mathcal{M}_i$ provide ($\epsilon_i$, $\delta_i$)-Differential Privacy. The sequence of $\mathcal{M}_{1, \ldots, k}(\mathcal{D})$ provides ($\Sigma_i \epsilon^i$ $\Sigma_i\delta_i$)-DP.

Sequential composition is, again, loose for (∈, δ)-DP which has resulted in various advanced theorems for composition. Yet, tight composition bounds are also studied in the RDP domain which has the nice property of $\epsilon_{RDP,i}$ being summed up as well. So, for the sequence of k mechanisms executions each providing (α, $\epsilon_{RDP,i}$)-RDP the total guarantee composes to (α, $\Sigma_i \epsilon_{RDP,i}$)-RDP. Using the equations above, a tight per step η can be derived from this.

These aspects of DP build the foundations of private deep learning. In private deep learning, the tradeoff between privacy and utility becomes important because practical neural networks need to offer a certain accuracy. Although increasing privacy through the (∈, δ) guarantee always decreases utility, other factors also affect the accuracy of models, such as the quantity of training data and the value chosen for the clipping norm C.

Various properties of C affect its optimal value. Unfortunately, $\Delta f_2$ cannot be determined in advance for the size of gradients, so it has been proposed to clip each per example gradient to C, bounding the influence of one example on an update. This parameter can be set to maximize model accuracy and offer the rule to set C to "the median of the norms of the unclipped gradients over the course of training." The following effects can be taken into account: the clipped gradient may point in a different direction from the original gradient if C is too small, but if C is too large, the large magnitude of noise added decreases utility. Since gradients change over the course of training, the optimal value of C at the beginning of training may no longer be optimal toward the end of training. Adaptively setting the clipping norm may further improve utility by changing C as training progresses or setting C differently for each layer. To improve utility for a set privacy guarantee, the value of C can be tuned and adapted.

TABLE 1

| $\mathcal{A}_{prob}$ notations | |
|---|---|
| Symbol | Description |
| $\mathcal{U}$ | Data universe $\mathcal{U}$, i.e., a set of individuals that are possibly present in the original dataset $\mathcal{D}$. |
| $\bar{\mathcal{D}}$ | $\bar{\mathcal{D}} \subset \mathcal{D}$ denotes the subset of records of whom $\mathcal{A}_{prob}$ knows they have participated in $\mathcal{D}$. |
| n | $\lvert\mathcal{D}\rvert$. |
| $\mathcal{M}$ | Mechanism $\mathcal{M}$ and parameters, e.g., (∈, δ, $f$) for $\mathcal{M}_{Lap}$ |
| $f$ | Data analysis function $f(\cdot)$. |
| r | Differentially private output r yielded by $\mathcal{M}$. |
| $p_\omega(\cdot)$ | probability density function of $\mathcal{M}$ given world ω. |

Strong Probabilistic Adversary. For interpretation of (∈, δ) the privacy guarantee with regard to a desired bound on the Bayesian belief of a probabilistic adversary $\mathcal{A}_{prob}$. $\mathcal{A}_{prob}$'s knowledge is modeled as the tuple ($\mathcal{U}$, $\bar{\mathcal{D}}$, n, $\mathcal{M}$, f, r) which is defined in Table 1. $\mathcal{A}_{prob}$ seeks to identify $\mathcal{D}/\bar{\mathcal{D}}$ by evaluating possible combinations of missing individuals drawn from $\mathcal{U}$, which can be formally denoted as possible worlds.

$$\Psi = \{\bar{\mathcal{D}} \cup \{d_1, \ldots, d_n\} \mid d_1, \ldots, d_n \in \mathcal{U} \setminus \bar{\mathcal{D}}\}$$

$\mathcal{A}_{prob}$ assigns a probability to each world ω∈P, reflecting the confidence that w was used as input to $\mathcal{M}$. This confidence can be referred to as belief β(ω). The posterior belief of $\mathcal{A}_{prob}$ on world $\omega_i$ is defined as conditional probability:

$$\begin{aligned}
\beta(\omega_i) &= Pr(\omega_i \mid \mathcal{M}(\cdot) = r) && (1)\\
&= \frac{Pr(\mathcal{M}(\cdot) = r \mid \omega_i) \cdot Pr(\omega_i)}{Pr(\mathcal{M}(\cdot) = r)}\\
&= \frac{Pr(\mathcal{M}(\cdot) = r \mid \omega_i) \cdot Pr(\omega_i)}{\sum_j Pr(\mathcal{M}(\cdot) = r \mid \omega_j) \cdot Pr(\omega_j)}\\
&= \frac{Pr(\mathcal{M}(\omega_i) = r) \cdot Pr(\omega_i)}{\sum_j Pr(\mathcal{M}(\omega_j) = r \cdot Pr(\omega_j)}\\
&= \frac{p_{\omega_i}(r) \cdot Pr(\omega_i)}{\sum_j p_{\omega_j}(r) \cdot Pr(\omega_j)} && (2)
\end{aligned}$$

Using the fact that $\mathcal{M}$ represents a continuous random variable and the choice of worlds is discrete, Bayes theorem allows inserting $\mathcal{M}$'s probability density function (PDF) in step 2. The firmest guess of $\mathcal{A}_{prob}$ is represented by the world ω having the highest corresponding belief. However, it is not guaranteed that ω represents the true world $\mathcal{D}$. From this point, the terms confidence and posterior belief are used interchangeably.

The initial distribution over y reflects the prior belief on each world by $\mathcal{A}_{prob}$. It is assumed that this is a discrete uniform distribution among worlds, thus $$Pr(\omega) = \frac{1}{|\Psi|}, \forall \omega \in \Psi.$$

By bounding the belief $\beta(\tilde{\omega})$ for the true world ω by a chosen constant ρ, a desired level of privacy can be guaranteed. It is noted that bounding the belief for the true world implicitly also bounds the belief for any other world.

The noise added to hide $\overline{\omega}$ can be scaled to the sensitivity of the result to a change in $\tilde{\omega}$. Instead of basing this value on global sensitivity, the largest possible contribution of any individual can be quantified as the sensitive range $S(f)$.

Definition 3 (Sensitive Range $S(f)$). The sensitive range of a query function $f$ is the range of $f$:

$$S(f) = \max_{\omega_1, \omega_2 \in \Psi} \| f(\omega_1) - f\omega_2 \|$$

This approach resulted in the introduction of differential identifiability which is defined below in Definition 4.

Definition 4 (Differential Identifiability). Given a dataset D, a randomized mechanism $\mathcal{M}$ satisfies ρ-Differential Identifiability if among all possible datasets $\mathcal{D}_1, \mathcal{D}_2, \ldots, \mathcal{D}_m$ differing in one individual w.r.t. $\mathcal{D}$ the posterior belief β, after getting the response r∈R, is bounded by ρ:

$$\beta(\mathcal{D}_i | \mathcal{M}(\mathcal{D}) = r) \leq \rho. \tag{3}$$

The notation of possible world ω∈Ψ is replaces by possible datasets which is semantically the same. ρ-Differential Identifiability implies that after receiving a mechanism's output r the true dataset $\mathcal{D}$ can be identified by $\mathcal{A}_{prob}$ with confidence $\beta(\mathcal{D}) \leq \rho$.

DP and Differential Identifiability have been shown to be equal when $|\Psi|=2$, since DP considers two neighboring datasets $\mathcal{D}$, $\mathcal{D}'$ by definition. Specifically, Differential Identifiability is equal to bounded $\mathcal{D}$, $\mathcal{D}'$ in this case, since possible worlds each have the same number of records. Under this assumption, the sensitive range $S(f)$ represents a special case of local sensitivity in which both $\mathcal{D}$ and $\mathcal{D}'$ are fixed. It can be assumed that $\Delta f$ is equal to $S(f)$. If this condition is met, the relation ρ↔∈ for $\mathcal{M}_{Lap}$ is:

$$\frac{S(f)}{\lambda} = \epsilon = \left| \ln\left(\frac{\rho}{1-\rho}\right) \right| \longleftrightarrow \rho = \frac{1}{1 + e^{-\frac{S(f)}{\lambda}}} = \frac{1}{1 + e^{-\epsilon}} > \frac{1}{2}. \tag{4}$$

Framework For Interpreting DP. Based on the original strong probabilistic adversary $\mathcal{A}_{prob}$ provided above, an interpretability framework is formulated that allows to translate formal (∈, δ) guarantees into concrete re-identification probabilities. First, the original confidence upper bound of Equation (3) can be extended to work with arbitrary DP mechanisms and a discussion is provided with regard to how δ is integrated into the confidence bound. Second, $\mathcal{A}_{prob}$ is extended to behave adaptively with regard to a sequence of mechanisms. It is shown below that that the resulting adaptive adversary $\mathcal{A}_{adapt}$ behaves as assumed by composition theorems. Third, expected membership advantage $\rho_a$ is defined and suggested as a privacy measure complementing ρ, which we will refer to as $\rho_c$ in the following.

General Adversarial Confidence Bound. According to Equation (4) the probabilistic adversary $\mathcal{D}$ with unbiased priors (i.e., 0.5) regarding neighboring datasets $\mathcal{D}$, $\mathcal{D}'$ has a maximum posterior belief of $1/(1+e^{-\epsilon})$ when the ∈-differentially private Laplace mechanism (cf. Definition 1) is applied to $f$ having a scalar output. In the following, it is shown that this upper bound holds also for arbitrary ∈-differentially private mechanisms with multidimensional output. Therefore, the general belief calculation of Equation (1) can be bound by the inequality of Definition 1.

$$\beta(\mathcal{D}) = \frac{Pr(\mathcal{M}(\mathcal{D}) = r)}{Pr(\mathcal{M}(\mathcal{D}) = r) + Pr(\mathcal{M}(\mathcal{D}') = r)} \leq$$

$$\frac{Pr(\mathcal{M}(\mathcal{D}') = r) \cdot e^{\epsilon} + \delta}{Pr(\mathcal{M}(\mathcal{D}') = r) \cdot e^{\epsilon} + \delta + \cdot Pr(\mathcal{M}(\mathcal{D}') = r)} = \frac{1}{1 + \frac{Pr(\mathcal{M}(\mathcal{D}') = r)}{Pr(\mathcal{M}(\mathcal{D}') = r) \cdot e^{\epsilon} + \delta}}$$

For δ=0, the last equation simplifies to $1/(1+e^{-\epsilon})$ so it can be concluded:

Corollary 1. For any ∈-differentially private mechanism, the strong probabilistic adversary's confidence on either dataset $\mathcal{D}$, $\mathcal{D}'$ is bounded by $$\rho(\epsilon) = \frac{1}{1 + e^{-\epsilon}}$$

For δ>0, however, it was observed that where $Pr(\mathcal{M}(\mathcal{D}')=r)$ becomes very small, $\beta(\mathcal{D})$ grows towards 1:

$$\lim_{Pr(\mathcal{M}(\mathcal{D}')) \to 0} \frac{1}{1 + \frac{Pr(\mathcal{M}(\mathcal{D}') = r)}{Pr(\mathcal{M}(\mathcal{D}') = r) \cdot e^{\epsilon} + \delta}} = 1 \tag{5}$$

Figure 1B:
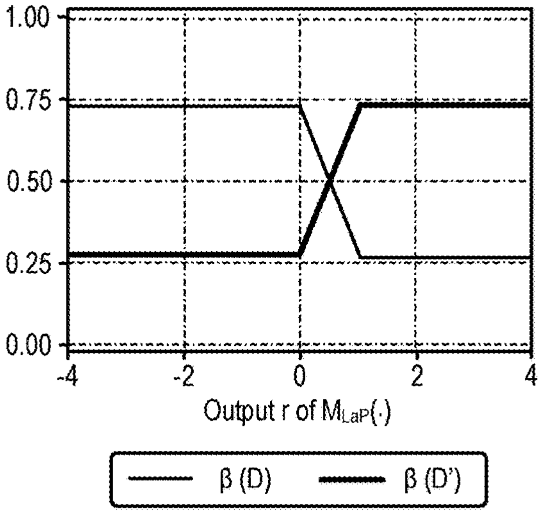

Hence, if the Gaussian mechanism $\mathcal{M}_{Gau}$ samples a value at the tails of the distribution in the direction away from $f(\mathcal{D}')$, the posterior belief for $\mathcal{D}$ and $\mathcal{D}'$ head to 1 and 0, respectively. If a value is sampled from the tails in the direction of $f(\mathcal{D}')$, the posterior belief for $\mathcal{D}$ and $\mathcal{D}'$ go to 0 and 1, respectively. The difference in behavior between the Laplace and Gaussian mechanism when large values of noise are sampled is demonstrated. Fixes $f(\mathcal{D})=0$, $f(\mathcal{D}')=1$ and $\Delta f=\Delta f_2=1$ can be utilized. In diagram 100*b* of FIG. 1(*b*), the effect of the output of $\mathcal{M}_{Lap}$ on the posterior beliefs for $\mathcal{D}$ and $\mathcal{D}'$ when ∈=1, $\delta\mathcal{M}^{[OBJ]}_{Gau}$ results in an upper bound of 1, as is visualized in diagram 100*a* of FIG. 1(*a*). Therefore, $\beta(\mathcal{D})$ can only be bound for $1-\delta\mathcal{M}^{[OBJ]}_{Gau}$ $\mathcal{M}^{[OBJ]}_{Gau}$ provides ∈-DP with probability 1-δ.

β is now extended to k-dimensional (∈, δ)-differentially private mechanisms where $f(\mathcal{D}) \to \mathbb{R}^k$.

Theorem 4. The general confidence bound of Corollary 1 holds for multidimensional (∈, δ)-differentially private mechanisms with probability 1-δ.

Proof. Properties of RDP can be used to prove the confidence bound for multidimensional (∈, δ)-differentially private mechanisms.

$$\beta(\mathcal{D}) = \frac{Pr(\mathcal{M}(\mathcal{D}) = r)}{Pr(\mathcal{M}(\mathcal{D}) = r) + Pr(\mathcal{M}(\mathcal{D}') = r)} \tag{6}$$

$$= \frac{1}{1 + Pr(\mathcal{M}(\mathcal{D}') = r) / Pr(\mathcal{M}(\mathcal{D}) = r)}$$

$$\leq \frac{1}{1 + \frac{Pr(\mathcal{M}(\mathcal{D}') = r)}{(e^{\epsilon} RDP \cdot Pr(\mathcal{M}(\mathcal{D}') = r))^{1-1/\alpha}}} \tag{7}$$

$$= \frac{1}{1 + e^{-\epsilon} RDP^{(1-1/\alpha)} \cdot Pr(\mathcal{M}(\mathcal{D}') = r)^{1/\alpha}} \tag{8}$$

In the step from Equation (6) to (7), probability preservation properties are used to prove that RDP guarantees can be converted to ($\in$, $\delta$) guarantees. In the context of this proof, it is implied that $\in$-DP holds when $e^{-\in}{}_{RDP}$ Pr($\mathcal{M}$($\mathcal{D}'$)=r)>$\delta^{\alpha}/(^{\alpha-1})$, since otherwise Pr(M($\mathcal{D}$)=r)<$\delta$. It can therefore be assumed that $e^{-\in}{}_{RDP}\mathcal{M}$[OBJ]($\mathcal{D}'$)=r)>$\delta^{\alpha/(\alpha-1)}$), which occurs at most in 1-$\delta$ cases, and continue from Equation (8):

$$\leq \frac{1}{1 + \left| e^{-\epsilon_{RDP}}{}^{(1-1)/\alpha)} \cdot \left(\delta^{\alpha/(\alpha-1)} \cdot e^{-\epsilon_{RDP}}\right)^{1/\alpha}\right.}$$

$$= \frac{1}{1 + e^{-\epsilon_{RDP}} \cdot \delta^{1/(\alpha-1)}}$$

$$= \frac{1}{1 + e^{-\epsilon_{RDP}} \cdot e^{-1/(\alpha-1)ln(1/\delta)}}$$

$$= \frac{1}{1 + e^{-\left(\epsilon_{RDP}+(\alpha-1)^{-1}ln(1/\delta)\right)}} \quad (9)$$

-continued $$= \frac{1}{1 + e^{-\epsilon}} \quad (10)$$

In the step from Equation (9) to (10), it is noted the exponent perfectly matches the conversion from $\in$ to $\in_{RDP}$.

Consequently, Corollary 1 holds with probability 1-$\delta$ for $\mathcal{M}_{Gau}$. Hence, the general confidence upper bound for ($\in$, $\delta$)-differentially private mechanisms can be defined as follows:

Definition 5 (Expected Adversarial Confidence Bound). For any ($\in$, $\delta$)-differentially private mechanism, the expected bound on the strong probabilistic adversary's confidence on either dataset $\mathcal{D}$, $\mathcal{D}'$ is $$\rho_c(\epsilon, \delta) = \mathbb{E}[\rho(\epsilon)] = (1-\delta)\rho(\epsilon) + \delta = \rho(\epsilon) + \delta(1-\rho(\epsilon)).$$

Adaptive Posterior Belief Adversary. $\mathcal{A}_{prob}$ computes posterior beliefs $\beta(\cdot)$ for datasets $\mathcal{D}$ and $\mathcal{D}'$ and makes a guess arg $max_{\mathcal{D}\in\{\mathcal{D},\mathcal{D}'\}}\beta(\mathcal{D})$. Therefore, the strong $\mathcal{A}_{prob}$ represents a naïve Bayes classifier choosing an option w.r.t. to the highest posterior probability. The input features are the results r observed by $\mathcal{A}_{prob}$, which are independently sampled and thus fulfill the i.i.d. assumption. Also, the noise distributions are known to $\mathcal{A}_{prob}$, thus making the naïve Bayes classifier the strongest probabilistic adversary in our scenario.

A universal adversary against DP observes multiple subsequent function results and adapts once a new result r is obtained. To extend $\mathcal{A}_{prob}$ to an adaptive adversary $\mathcal{A}_{adapt}$, adaptive beliefs can be defined as provided below.

Definition 6 (Adaptive Posterior Belief). Let $\mathcal{D}$, $\mathcal{D}'$ be neighboring datasets and $\mathcal{M}_1$, $\mathcal{M}_2$ be $\in_1$, $\in_2$-differentially private mechanisms. If $\mathcal{M}_1$ ($\mathcal{D}$) is executed first with posterior belief $\beta_1(\mathcal{D})$, the adaptive belief for $\mathcal{D}$ after executing $\mathcal{M}_2(\mathcal{D})$ is:

$$\beta_2(\mathcal{D}, \beta_1(\mathcal{D})) = \frac{Pr(\mathcal{M}_2(\mathcal{D}) = r) \cdot \beta_1(\mathcal{D})}{Pr(\mathcal{M}_2(\mathcal{D}) = r) \cdot \beta_1(\mathcal{D}) + Pr(\mathcal{M}_2(\mathcal{D}') = r)(1 - \beta_1(\mathcal{D}))}$$

Given k iterative independent function evaluations, $\beta_k(\mathcal{D})$ is written to mean $\beta_k(\mathcal{D}, \beta_{k-1}\ \mathcal{D}, \ldots))$. To compute $\beta_k(\mathcal{D})$, the adaptive adversary $\mathcal{A}_{adapt}$ computes adaptive posterior beliefs as specified by Algorithm 1.

Algorithm 1 Strong Adaptive Adversary

Input: datasets $\mathcal{D}, \mathcal{D}'$, mechanism outputs R = $r_1, \ldots, r_k$, mechanisms $\mathcal{M}_1, \ldots, \mathcal{M}_k$
Output: $\beta_k(\mathcal{D})$, $\beta_k(\mathcal{D}')$
1: $\beta_0(\mathcal{D}), \beta_0(\mathcal{D}') \leftarrow 0.5$
2: for i $\in$ {1, ..., k} do
3: $p\mathcal{D} \leftarrow Pr(\mathcal{M}_i(\mathcal{D}) = r_i)$
4: $p\mathcal{D}' \leftarrow Pr(\mathcal{M}_i(\mathcal{D}') = r_i)$
5. $\beta_i(\mathcal{D}) \leftarrow \beta_{i-1}(\mathcal{D}) \cdot p\mathcal{D}/(p\mathcal{D} \cdot \beta_{i-1}(\mathcal{D}) + p\mathcal{D}'\beta_{i-1}(\mathcal{D}'))$
6. $\beta_i(\mathcal{D}') \leftarrow \beta_{i-1}(\mathcal{D}') \cdot p\mathcal{D}/(p\mathcal{D} \cdot \beta_{i-1}(\mathcal{D}) + p\mathcal{D}'\beta_{i-1}(\mathcal{D}'))$
7. end for The calculation of $\beta_k(\mathcal{D})$ and $\beta_k(\mathcal{D}')$ as presented in Algorithm 1 can also be expressed as a closed form calculation which can be used later to further analyze the attacker.

$$\beta_k(\mathcal{D}) = \frac{\prod_{i=1}^{k} Pr(\mathcal{M}_i(\mathcal{D}) = r_i)}{\prod_{i=1}^{k} Pr(\mathcal{M}_i(\mathcal{D}) = r_i) + \prod_{i=1}^{k} Pr(\mathcal{M}_i(\mathcal{D}') = r_i)} = \frac{1}{1 + \frac{\prod_{i=1}^{k} Pr(\mathcal{M}_i(\mathcal{D}') = r_i')}{\prod_{i=1}^{k} Pr(\mathcal{M}_i(\mathcal{D}') = r_i)}}$$

Aspects of the associated proof are provided below in which it is assumed that the attacker starts with uniform priors. Thus, $\beta_1(\mathcal{D})$ is calculated to be:

$$\beta_1(\mathcal{D}) = \frac{Pr(\mathcal{M}_1(\mathcal{D}) = r_1)}{Pr(\mathcal{M}_1(\mathcal{D}) = r_1) + Pr(\mathcal{M}_1(\mathcal{D}') = r_1)} = \frac{1}{1 + \frac{Pr(\mathcal{M}_1(\mathcal{D}') = r_1)}{Pr(\mathcal{M}_1(\mathcal{D}) = r_1)}}$$

In the second step $\beta_1(\mathcal{D})$ is used as the prior, hence $\beta_2(\mathcal{D})$ is calculated as:

$$\beta_2(\mathcal{D}) = \frac{Pr(\mathcal{M}_2(\mathcal{D}) = r_2)\cdot\beta_1(\mathcal{D})}{Pr(\mathcal{M}_2(\mathcal{D}) = r_2)\cdot\beta_1(\mathcal{D}) + Pr(\mathcal{M}_2(\mathcal{D}') = r_2)\cdot(1-\beta_1(\mathcal{D}))} = \frac{1}{1 + \frac{Pr(\mathcal{M}_2(\mathcal{D}') = r_2) - Pr(\mathcal{M}_2(\mathcal{D}') = r_2)\cdot\beta_1(\mathcal{D})}{Pr(\mathcal{M}_2(\mathcal{D}) = r_2)\cdot\beta_1(\mathcal{D})}} =$$

$$\frac{1}{1 + \frac{Pr(\mathcal{M}_2(\mathcal{D}') = r_2) - \frac{Pr(\mathcal{M}_2(\mathcal{D}') = r_2)\cdot Pr(\mathcal{M}_1(\mathcal{D}) = r_1)}{Pr(\mathcal{M}_1(\mathcal{D}) = r_1) + Pr(\mathcal{M}_1(\mathcal{D}') = r_1)}}{\frac{Pr(\mathcal{M}_2(\mathcal{D}) = r_2)\cdot Pr(\mathcal{M}_1(\mathcal{D}) = r_1)}{Pr(\mathcal{M}_1(\mathcal{D}) = r_1) + Pr(\mathcal{M}_1(\mathcal{D}') = r_1)}}} =$$

$$\frac{1}{1 + \frac{Pr(\mathcal{M}_2(\mathcal{D}') = r_2)\cdot Pr(\mathcal{M}_1(\mathcal{D}') = r_1)}{Pr(\mathcal{M}_2(\mathcal{D}) = r_2)\cdot Pr(\mathcal{M}_1(\mathcal{D}') = r_1)}}$$

This scheme continues for all k iterations by induction.

Even though the closed form provides an efficient calculation scheme for $\beta_k(\mathcal{D})$, numerical issues can be experienced so Algorithm I can be used for practical simulation of $\mathcal{A}_{adapt}$. However, by applying the closed form, it can be shown that $\mathcal{A}_{adapt}$ operates as assumed by the sequential composition theorem (cf 3) which substantiates the strength of $\mathcal{A}_{adapt}$. It is also noted that $\beta_1(\mathcal{D})$ has the same form as $\beta_k(\mathcal{D})$, since the multiplication of two Gaussian distributions results in another Gaussian distribution. Therefore, the composition of several Gaussian mechanisms can be regarded as a single execution of a multidimensional mechanism with an adjusted privacy guarantee.

Theorem 5 (Composition of Adaptive Beliefs). Let $\mathcal{D}$, $\mathcal{D}'$ be neighboring datasets and $\mathcal{M}_1, \ldots, \mathcal{M}_k$ be an arbitrary sequence of mechanisms providing $\epsilon_1, \ldots, \epsilon_k$-Differentially Privacy, then $$\beta_k(\mathcal{D}) \le \rho\left(\sum_{i=1}^{k}\epsilon_i\right) \quad (11)$$

By using Definition 1 and $\delta=0$, the following can be bound:

$$\beta_k(\mathcal{D}) = \frac{1}{1 + \frac{\prod_{i=1}^{k} Pr(\mathcal{M}_i(\mathcal{D}') = r_i)}{\prod_{i=1}^{k} Pr(\mathcal{M}_i(\mathcal{D}) = r_i)}} \le \frac{1}{1 + \frac{\prod_{i=1}^{k} Pr(\mathcal{M}_i(\mathcal{D}') = r_i)}{\prod_{i=1}^{k} Pr(\mathcal{M}_i(\mathcal{D}') = r_i) * e^{\epsilon_i}}} =$$

$$\frac{1}{1 + \prod_{i=1}^{k} e^{-\epsilon_i}} = \frac{1}{1 + e^{-\sum_{i=1}^{k}\epsilon_i}} = \rho\left(\sum_{i=1}^{k}\epsilon_i\right) \square$$

This demonstrates that in the worst case $\mathcal{A}_{adapt}$ takes full advantage of the composition of $\epsilon$. But what about the case where $\delta>0$? The same $\sigma_1$ can be had in all dimensions as if it is assumed that the privacy budget $(\epsilon, \delta)$ is split equally s. t. $\epsilon_i=\epsilon_j$ and $\delta_i=\delta_j$ which, given previous assumptions, leads to $\sigma_i=\sigma_j$, $\forall_i$, $j \in \{1, \ldots, k\}$. The following can be transformed:

$$\beta_k(\mathcal{D}) = \frac{1}{1 + \prod_{i=1}^{k} \frac{Pr(\mathcal{M}_i(\mathcal{D}') = r_i)}{Pr(\mathcal{M}_i(\mathcal{D}) = r_i)}} \quad (12)$$

$$\le \frac{1}{1 + \prod_{i=1}^{k} e^{-\epsilon_i}} = \frac{1}{1 + e^{-\sum_{i=1}^{k}\epsilon_i}} = \rho\left(\sum_{i=1}^{k}\epsilon_i\right) \quad (13)$$

In the step from Equation (12) to (13), simplifications from Equations (6) to (10) in Theorem 4 are used. This short proof demonstrates that $\mathcal{A}_{adapt}$ behaves as expected by sequential composition theorems also for the $(\epsilon, \delta)$-differentially private Gaussian mechanism.

To take advantage of RDP composition, simplifications from Equation (6) to (9) can be used. The following transformations can be utilized:

$$\beta_k(\mathcal{D}) = \frac{1}{1 + \frac{\prod_{i=1}^{k} Pr(\mathcal{M}_i(\mathcal{D}') = r_i)}{\prod_{i=1}^{k} Pr(\mathcal{M}_i(\mathcal{D}) = r_i)}}$$

$$= \frac{1}{1 + \prod_{i=1}^{k} \frac{Pr(\mathcal{M}_i(\mathcal{D}') = r_i)}{Pr(\mathcal{M}_i(\mathcal{D}) = r_i)}} \quad (14)$$

$$\le \frac{1}{1 + \prod_{i=1}^{k} e^{-(\epsilon_{RDP,i} + (\alpha-1)^{-1} ln(1/\delta))}} \quad (15)$$

$$= \frac{1}{1 + e^{k(\alpha-1)^{-1} ln(1/\delta) - \sum_{i=1}^{k}\epsilon_{RDP,i}}}$$

$$= \frac{1}{1 + e^{(\alpha-1)^{-1} ln(1/\delta^k) - \sum_{i=1}^{k}\epsilon_{RDP,i}}}$$

$$= \rho\left(\sum_{i=1}^{k}\epsilon_{RDP,i} - (\alpha-1)^{-1}\ln(1/\delta^k)\right) \quad (16)$$

Equation (16) implies that an RDP-composed bound can be achieved with a composed $\delta$ value of $\delta^k$. It is known that sequential composition results in a composed $\delta$ value of $k\delta$. Since $\delta^k<k\delta$, RDP offers a stronger $(\epsilon, \delta)$ guarantee for the same $\rho_c$. This behavior can also be interpreted as the fact that holding the composed $(\epsilon, \delta)$ guarantee constant, the value of $\rho_c$ is greater when sequential composition is used compared to RDP. Therefore, RDP offers a tighter bound for $\rho_c$ under composition.

Expected Membership Advantage. The adaptive posterior belief adversary allows to transform the DP guarantee $(\epsilon, \delta)$ into a scalar measure $\rho_c$ indicating whether $\mathcal{A}_{adapt}$ can confidently re-identify an individual's record in a dataset. From an individual's point of view, of interest is deniability, i.e., if $\mathcal{A}_{adapt}$ has low confidence, an individual can plausibly deny that the hypothesis of $\mathcal{A}_{adapt}$ is correct. A resulting question concerns how often a guess by $\mathcal{A}_{adapt}$ about the presence of an individual is actually correct or what $\mathcal{A}_{adapt}$'s advantage is. As described above, it can be assumed that $\mathcal{A}_{adapt}$ operates as a naïve Bayes classifier with known probability distributions. Looking at the decision boundary of the classifier (i.e., when to choose $\mathcal{D}$ or $\mathcal{D}$ $\mathcal{M}$[illegible]$_{Gau}$ with different (∈, δ) guarantees, it is found that the decision boundary does not change as long as the PDFs are symmetric. For example, consider a scenario with given datasets $\mathcal{D}$, $\mathcal{D}'$ and query $f$. DOM→ℝ that yields $f(\mathcal{D})=0$ and $f(\mathcal{D}')=1$. Furthermore, assuming w.l.o.g. that $\Delta f_2=1$.

FIGS. 2(*a*) and 2(*b*) are diagrams 200*a*, 200*b*, respectively illustrating decision boundaries based on PDFs and confidence. It is shown that the decision boundary of $\mathcal{A}_{adapt}$ does not change when increasing the privacy guarantee since (∈, δ) causes the PDFs of $\mathcal{D}$ and $\mathcal{D}'$ to become squeezed. Thus, $\mathcal{A}_{adapt}$ will exclusively choose $\mathcal{D}$ if a value is sampled from the left, red region, and vice versa for $\mathcal{D}'$ in the right blue region. Still, confidence towards either decision declines.

Figure 2A:
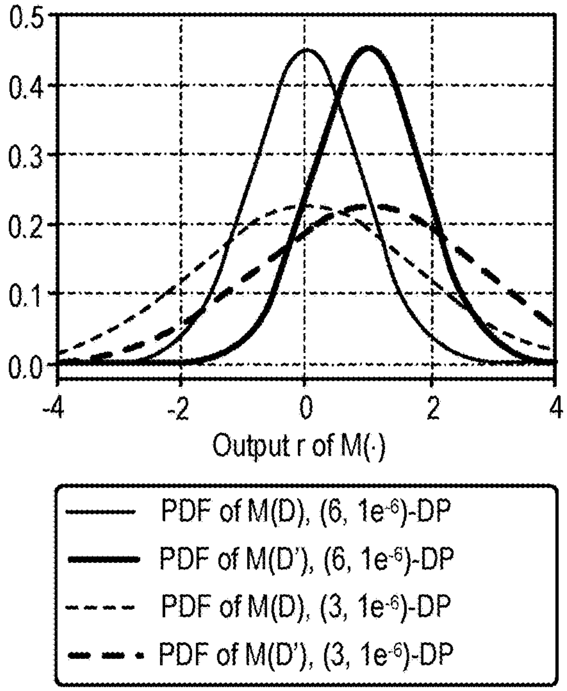
FIGS. 2A and 2B are diagrams respectively illustrating decision boundaries based on PDFs and confidence.
Figure 2B:
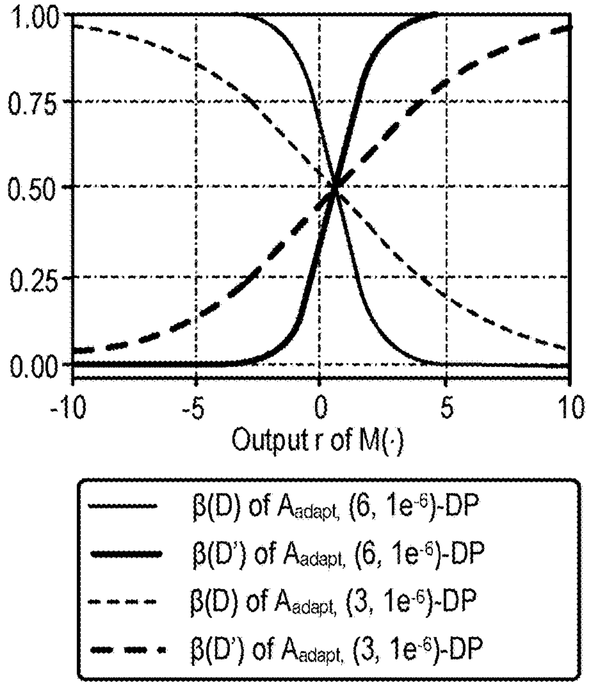

If a $(6, 10^{-6})$-$\mathcal{D}$ P $\mathcal{M}_{Gau}$ is applied to perturb the results of $f$, $\mathcal{A}_{adapt}$ has to choose between the two PDFs with solid lines in FIG. 2*a* based on the output $\mathcal{M}_{Gau}(\cdot)$=r. FIG. 2*b* visualizes the resulting posterior beliefs for $\mathcal{D}$, $\mathcal{D}'$ (solid lines), the highest of which $\mathcal{A}_{adapt}$ chooses given r. The regions where $\mathcal{A}_{adapt}$ chooses $\mathcal{D}$ are shaded red in both figures, and regions that result in the choice $\mathcal{D}'$ are shaded blue. Increasing the privacy guarantee to $(3, 10^{-6})$-DP (dashed lines in the figures) squeezes the PDFs and confidence curves. However, the decision boundary of the regions at which $\mathcal{A}_{adapt}$ chooses a certain dataset stay the same. Thus, it is important to note that holding r constant and reducing (∈, δ) solely affects the posterior beliefs of $\mathcal{A}_{adapt}$, not the choice (i.e., the order from most to least confident is maintained even while maximum posterior belief is lowered).

However, it is expected that the information "How likely is an adversary to guess the dataset in which I have participated?" to be a major point of interest when interpreting DP guarantees in iterative evaluations of $f$, like those found in data science use cases such as machine learning. Expected membership advantage $\rho_\alpha$ can be defined as the difference between the probabilities of $\mathcal{A}_{adapt}$ correctly identifying $\mathcal{D}$ (true positive rate) and of $\mathcal{A}_{adapt}$ misclassifying a member of $\mathcal{D}'$ as belonging to $\mathcal{D}$ (false negative rate), as in 40. The worst-case advantage $\rho_\alpha=1$ occurs in the case in which $\mathcal{M}$ always samples on that side of the decision boundary that belongs to the true dataset $\mathcal{D}$. In contrast to the analysis of $\rho_c$, $\rho_\alpha$ will not give a worst-case bound, but an average case estimation. Since $\mathcal{A}_{adapt}$ is a naïve Bayes classifier, the properties of normal distributions can be used. With the multidimensional region where $\mathcal{A}_{adapt}$ chooses $\mathcal{D}$ as $\int\mathcal{D}_c$ and where $\mathcal{A}_{adapt}$ chooses $\mathcal{D}'$ as $\int\mathcal{D}_i$:

$$\rho_\alpha = Pr(\text{Success} := Pr(\mathcal{A}_{adapt} = \mathcal{D} \mid \mathcal{D})) - Pr(\text{Error} := Pr(\mathcal{A}_{adapt} = \mathcal{D} \mid \mathcal{D}')) =$$

-continued $$\int_{Dc} Pr(\mathcal{M}(\mathcal{D}) = r)Pr(\mathcal{D})dr - \int_{Di} Pr(\mathcal{M}(\mathcal{D}) = r)Pr(\mathcal{D})dr.$$

The corresponding regions of error for the previous example are visualized in diagrams 300*a*, 300*b* of FIGS. 3(*a*) and 3(*b*). If $\mathcal{M}_{Gau}$ is applied to achieve (∈, δ)-DP, the exact membership advantage of $\mathcal{A}_{adapt}$ can be determined analytically. Two multidimensional Gaussian PDFs (i.e., $\mathcal{M}_{Gau}(\mathcal{D})$, $\mathcal{M}_{Gau}(\mathcal{D}')$) with known covariance matrix Σ and known means $\mu_1=f(\mathcal{D})$, $\mu_2=f(\mathcal{D}')$ can be considered.

$$\begin{aligned} Pr(\text{Success}) &= 1 - Pr(\text{Error}) \\ &= 1 - \Phi(-\Delta/2) \end{aligned}, \tag{17}$$

where φ is the cumulative distribution function (CDF) of the standard normal distribution and $\Delta \sqrt{(\mu_1-\mu_2)^{T\Sigma-1}(\mu_1-\mu_2)}$ the Mahalanobis distance. Adding independent noise in all dimensions $\Sigma=\sigma^2 II$, the Mahalanobis distance simplifies $$\Delta = \frac{\|\mu_1 - \mu_2\|}{\sigma}.$$

Definition 7 (Bound on the Expected Adversarial Membership Advantage). For the (∈, δ)-differentially private Gaussian mechanism, the expected membership advantage of the strong probabilistic adversary on either dataset $\mathcal{D}$, $\mathcal{D}'$ is $$\rho_\alpha(\epsilon,\delta) = \Phi(\Delta/2) - \Phi(-\Delta/2) = \Phi\left(\frac{\|\mu_1-\mu_2\|_2}{2\sigma_i}\right) - \Phi\left(-\frac{\|\mu_1-\mu_2)\|_2}{2\sigma_i}\right) = \Phi\left(\frac{\|\mu_1-\mu_2\|_2}{2\Delta f_2\left(\sqrt{2\ln(1.25/\delta)}/\epsilon\right)}\right) - \Phi\left(-\frac{\|\mu_1-\mu_2\|_2}{2\Delta f_2\left(\sqrt{2\ln(1.25/\delta)}/\epsilon\right)}\right) \le \Phi\left(\frac{1}{2\left(\sqrt{2\ln(1.25/\delta)}/\epsilon\right)}\right) - \Phi\left(-\frac{1}{2\left(\sqrt{2\ln(1.25/\delta)}/\epsilon\right)}\right)$$

Again, the current framework can express (∈, δ) guarantees with δ>0 via a scalar value $\rho_\alpha$. However, a specific membership advantage can be computed individually for different kinds of mechanisms $\mathcal{M}$.

Above it was evaluated how the confidence of $\mathcal{A}_{adapt}$ changes under composition. A similar analysis of the membership advantage under composition is required. Again, the elucidations can be restricted to the Gaussian mechanism. As shown above, the k-fold composition of $\mathcal{M}_{Gau_i}$, each step guaranteeing $(\alpha, \epsilon_{RDP,i})$-RDP, can be represented by a single execution of $\mathcal{M}_{Gau}$ with k-dimensional output guaranteeing $(\alpha, \epsilon_{RDP}=k, \epsilon_{RDP,i})$. For this proof, it can be assumed that each of the composed mechanism executions has the same sensitivity $\|\mu_{1,i}-\mu_{2,i}\|=\Delta f_2$. A single execution of $\mathcal{M}_{Gau}$ can be analyzed with the tools described above. Definition 7 yields $$\rho_\alpha = \Phi(\Delta/2) - \Phi(-\Delta/2) = \Phi\left(\frac{\|\mu_1-\mu_2\|_2}{2\sigma_i}\right) - \Phi\left(-\frac{\|\mu_1-\mu_2)\|_2}{2\sigma_i}\right) =$$

-continued $$\Phi\left(\frac{\sqrt{k}\,\|\mu_{1,i}-\mu_{2,i}\|2}{2\Delta f_2\sqrt{\alpha/(2\epsilon_{RDP,i})}}\right)-\left(-\frac{\sqrt{k}\,\|\mu_{1,i}-\mu_{2,i}\|2}{2\Delta f_2\sqrt{\alpha/(2\epsilon_{RDP,i})}}\right)=$$

$$\Phi\left(\frac{\sqrt{k}}{2\sqrt{\alpha/(2\epsilon_{RDP,i})}}\right)-\Phi\left(-\frac{\sqrt{k}}{2\sqrt{\alpha/(2\epsilon_{RDP,i})}}\right)=$$

$$\Phi\left(\sqrt{\frac{k\epsilon_{RDP,i}}{2\alpha}}\right)-\Phi\left(-\sqrt{\frac{k\epsilon_{RDP,i}}{2\alpha}}\right)=\Phi\left(\sqrt{\frac{\epsilon_{RDP,i}}{2\alpha}}\right)-\Phi\left(-\sqrt{\frac{\epsilon_{RDP,i}}{2\alpha}}\right)$$

The result shows that the strategy of $\mathcal{A}_{adapt}$ fully takes advantage of the RDP composition properties of $\epsilon_{RDP,i}$ and $\alpha$. As expected, $\rho_a$ takes on the same value, regardless of whether k composition steps with $\epsilon_{RDP,i}$ or a single composition step with $\epsilon$RDP is carried out.

Privacy Regimes. With confidence $\rho_c$ and expected membership advantage Pu two measures were defined that taken together form the current framework for interpreting DP guarantees ($\epsilon$, $\delta$). While $\rho_a$ indicates the likelihood with which $\mathcal{A}_{adapt}$ is to discover any participant's data correctly, $\rho_c$ complements this information with the plausibility with which any participant in the data can argue that $\mathcal{A}_{adapt}$ guess is incorrect. Here it is demonstrated how the current framework can be applied to measure the level of protection independent of any particular dataset $\mathcal{D}$. Furthermore, several, allegedly secure ($\epsilon$, $\delta$) pairs suggested in literature are revisited and interpret their protection. Finally, general guidance is provided to realize high, mid or low to no privacy regimes.

Figure 4A:
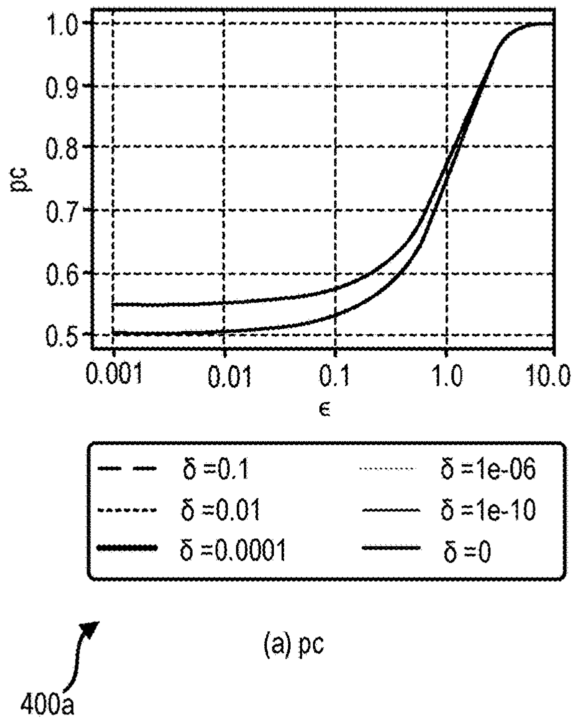
FIGS. 4A and 4B are diagrams respectively illustrating expected adversarial worst-case confidence bound $\rho_c$ and the adversarial membership advantage $\rho_\alpha$ for various ($\in$, $\delta$) when using $\mathcal{M}_{Gau}$ for perturbation.
Figure 4B:
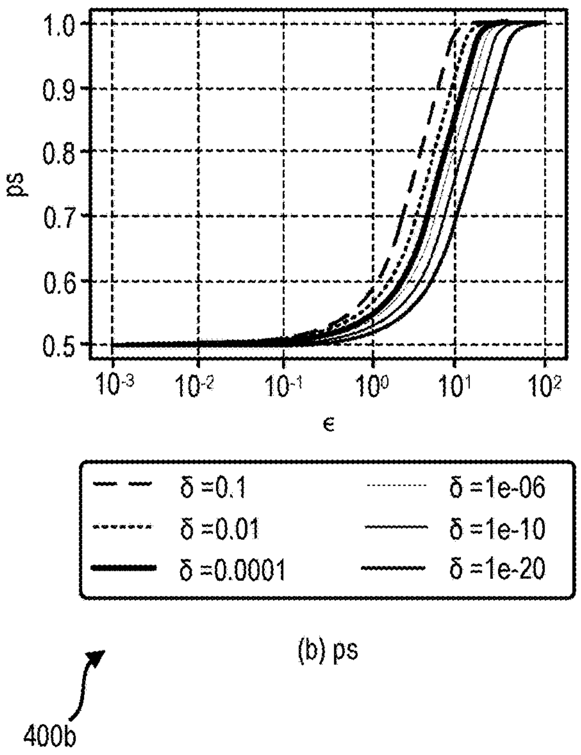
Figure 6A:
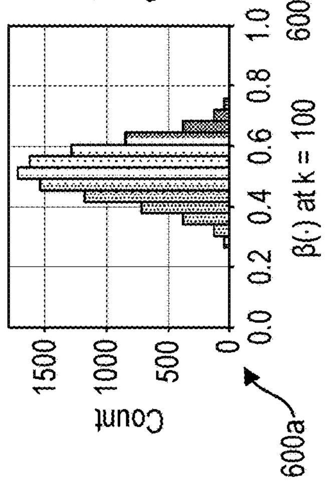
FIGS. 6A-6D are diagrams illustrating a confidence distribution of $\mathcal{A}$adapt at the end of 10,000 runs, i.e., after composition over different $\varepsilon$ and fixed $\delta$=0.001.
Figure 6B:
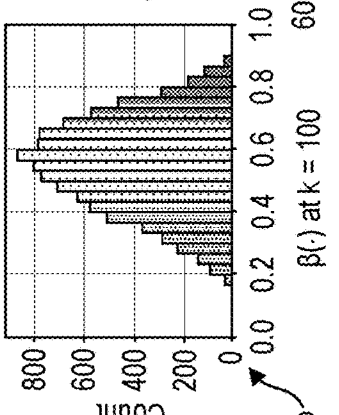
Figure 6C:
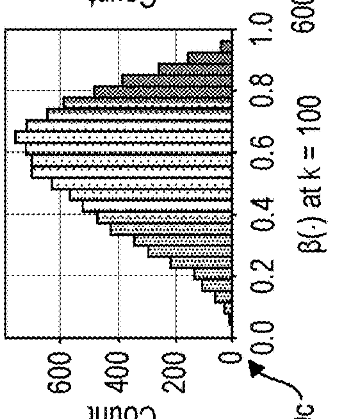
Figure 6D:
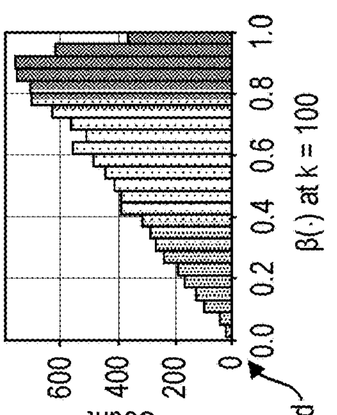
Figure 7A:
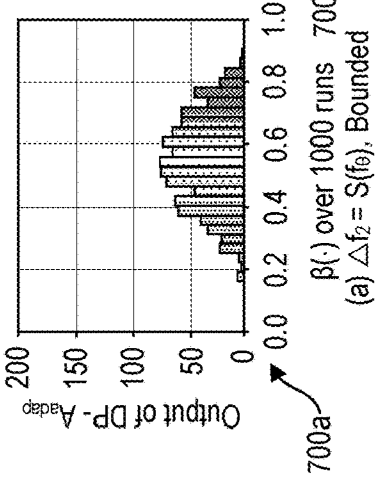
FIGS. 7A-7D are diagrams illustrating a confidence distribution of $\mathcal{A}$adapt at the end of 30 epochs, i.e., after composition with $\delta$=0.001; these diagrams show the distribution for global sensitivity, which yields strong privacy and little $\Delta f_2=S(f)$, which yields a distribution identical to its counterpart using synthetic data.
Figure 7B:
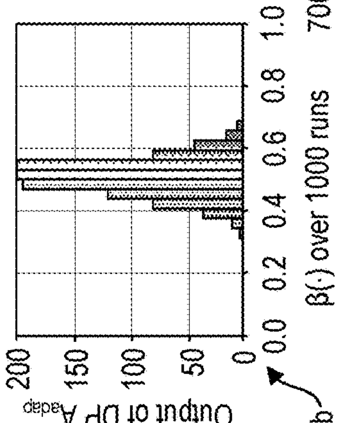
Figure 7C:
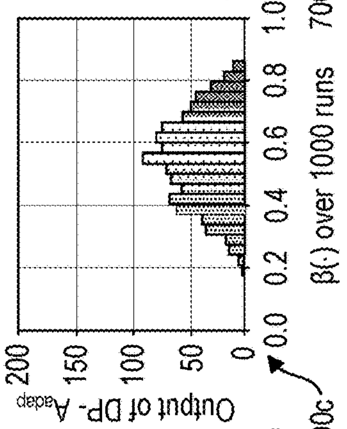
Figure 7D:
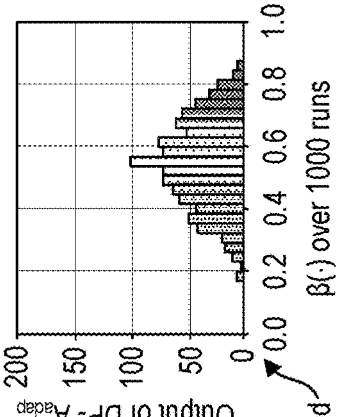

The interpretability framework can be applied in two steps. First, the participants in the dataset receive a predefined ($\epsilon$, $\delta$) guarantee. This ($\epsilon$, $\delta$) guarantee is based on the maximum tolerable decrease in utility (e.g., accuracy) of a function $f$ evaluated by a data analyst. The participants interpret the resulting tuple ($\rho_c$, $\rho_a$) w.r.t. their protection. Each participant can either reject or accept the use of their data by the data analyst. Second, participants are free to suggest an ($\epsilon$, $\delta$) based on the corresponding adversarial confidence and membership advantage ($\rho_c$, $\rho_\alpha$) which is in turn evaluated by the data analyst w.r.t. expected utility of $f$. To enable participants to perform this matching, general curves of $\rho_c$ and $\rho_a$ are provided for different ($\epsilon$, $\delta$) as shown in diagrams 400*a*, 400*b* of FIGS. 4(*a*), 4(*b*). For $\rho_a$, the curves are specific for $\mathcal{M}_{G\alpha u}$. In contrast, $\rho_c$ is independent of $\mathcal{M}$. To compute both measures, Definition 5 and Definition 7 can be used. It can also be assumed w.l.o.g. that $f(\mathcal{D})=(0_1, \mathbf{0}_2, \ldots, 0_k)$ and $f(\mathcal{D}')=1_1, \mathbf{1}_2, \ldots, \mathbf{1}_k)$ for all dimensions k. Thus, $f(\mathcal{D})$ and $\Delta f_2=\sqrt{k}(\mathcal{D}')$ are maximally distinguishable, resulting in [OBJ]. FIG. 4*a* illustrates that there is no significant difference between the expected worst-case confidence of $\mathcal{A}_{adapt}$ for $\epsilon$-$\mathcal{D}$P and ($\epsilon$, $\delta$)-$\mathcal{D}$P for $0<\delta<0.1$. In contrast, $\rho_a$ strongly depends on the choice of $\delta$ as depicted in FIG. 4*b*. For example, $\rho_a$ is low for (2, $10^{-6}$)-DP indicating that the probability of $\mathcal{A}_{adapt}$ choosing $\mathcal{D}$ is similar to choosing $\mathcal{D}'$. Yet, the corresponding $\rho_c$ is high, which provides support that $\mathcal{A}_{adapt}$ guesses is correct. With these implications in mind, data owners and data analysts are empowered to discuss about acceptable privacy guarantees.

Validation Over Synthetic Data. The following demonstrates how the confidence and membership advantage of $\mathcal{A}_{adapt}$ develop in an empirical example. The evaluation characterizes how well $\rho_c$ and $\rho_a$ actually model the expected membership advantage risk for data members and how effective $\mathcal{A}_{adapt}$ behaves on synthetic data. As $\mathcal{A}_{adapt}$ is assumed to know all data member except for one, the size of $\mathcal{D}$ does not influence her. For this reason, the following tiny data universe U, true dataset $\mathcal{D}$ and alternative $\mathcal{D}'$ presented in Tables 2, 3 and 4 was used. Let U represent a set of employees that were offered to participate in a survey about their hourly wage. Alice, Bob and Carol participated. Dan did not. Thus, the survey data $\mathcal{D}$ consists of 3 entries. The survey owner allows data analysts to pose queries to $\mathcal{D}$ until a DP budget of ($\epsilon$=5, $\delta$=0.01) is consumed. $\mathcal{A}_{adapt}$ is the data analyst that queries $\mathcal{D}$. Aside from learning statistics about the wage, $\mathcal{A}_{adapt}$ is also interested in knowing about who participated. So far, she knows that Alice and Carol participated for sure and there are three people in total. Thus, she has to decide between $\mathcal{D}$ and $\mathcal{D}'$, i.e., whether Bob or Dan is the missing entry. As a side information, she knows that the employer pays at least \$1 and a maximum of \$10. As a consequence, when $\mathcal{A}_{adapt}$ is allowed to ask only the sum query function, $S(f)=\Delta f_2=9$. Further, the Gaussian mechanism is known to be used for anonymization.

TABLE 2

| $\mathcal{U}$ | |
|---|---|
| Name | Wage |
| Alice | \$5 |
| Bob | \$10 |
| Carol | \$2 |
| Dan | \$1 |

TABLE 3

| $\mathcal{D}$ | |
|---|---|
| Name | Wage |
| Alice | \$5 |
| Bob | \$10 |
| Carol | \$2 |

TABLE 4

| $\tilde{\mathcal{D}}$ | |
|---|---|
| Name | Wage |
| Alice | \$5 |
| Dan | \$1 |
| Carol | \$2 |

Given this prior information, $\mathcal{A}_{adapt}$ iteratively updates her belief on $\mathcal{D}$, $\mathcal{D}'$ after each query. She makes a final guess after the whole ($\epsilon$, $\delta$)-budget has been used. By using the current framework ($\rho_c$, $\rho_a$), data members (especially Bob in this case) can compute their protection guarantee: What is the advantage of $\mathcal{A}_{adapt}$ in disclosing a person's participation (i.e., $\rho_a$)? How plausibly can that person deny a revelation (i.e., ($\rho_c$) by $\mathcal{A}_{adapt}$? Referring to Definition 7 and Definition 5, $\rho_a$($\epsilon$=5, $\delta$=0.01)=0.5 is computed under composition and $\rho_c$ ($\epsilon$=5, $\delta$=0.01)=0.99 illustrating that the risk of re-identification is quite high and the deniability extremely low. However, to show if $\mathcal{A}_{adapt}$ actually reaches those values her behavior can be empirically analyzed by iteratively querying $\mathcal{D}$ and applying Algorithm 1 after each query. k=100 queries can be used and the experiment can be repeated 10,000 times to estimate membership advantage and show the distribution of confidence at the end of each run. As it is known that the adversary will compose k times, the RDP composition scheme can be used to determine what noise scale can be applied for each individual query. In diagram 500*a* of FIG. 5*a* the adaptive posterior beliefs for $\mathcal{D}$ and $\mathcal{D}'$ are depicted. After some fluctuation, the belief for $\mathcal{D}$ starts growing up to 0.90. Consequently, the final guess of $\mathcal{A}_{adapt}$ is $\mathcal{D}$ which is correct. The guesses over all runs are summarized in diagram 500*b* of FIG. 5(*b*). Here, it is seen that about 75% of the guesses of $\mathcal{A}_{adapt}$ are correct which corresponds exactly to the expected membership advantage of our threat model. However, the predicted upper bound of 0.99 was not reached in the sample run. In contrast to $\rho_a$, $\rho_c$ is a worst case bound, not an expectation. Thus, the final belief of $\mathcal{A}_{adapt}$ approaches $\rho_c$ very rarely.

To illustrate this phenomenon, a a histogram over the beliefs at the end of each run for various choices of $\rho_c$ in diagram 600 of FIG. 6. FIG. 6 illustrates that the predicted worst case bound was reached in a small proportion of runs. This effect becomes more visible when $\in$ is lower.

A final note on $\delta$ which describes the probability of exceeding $\rho_c$. When looking closely at the histograms, one can see that there are some (small) columns for a range of values that are larger than the worst-case bound. Their proportion to all runs can be calculated, e.g., 0.0008 for $\in=5$ which is less than the expected $\delta$.

Application to Deep Learning. A natural question arising is how the introduced adversary $\mathcal{A}_{adapt}$ behaves on real data and high dimensional, iterative differentially private function evaluations. Such characteristics are typically found in Deep Learning classification tasks. Here, a neural network (NN) is provided a training dataset $\mathcal{D}$ to learn a prediction function $\hat{y}=f_{nn}(x)$ given $(x,y) \in \mathcal{D}$. Learning is achieved by means of an optimizer. Afterwards, the accuracy of the learned prediction function $f_{nn}(\cdot)$ is tested on a dataset $\mathcal{D}^{test}$.

A variety of differentially private optimizers for deep learning can be utilized. These optimizers represent a differentially private training mechanism $\mathcal{M}_{nn}(f_\theta(\cdot))$ that updates the weights $\theta_t$ per training step $t \in T$ with $\theta_t \leftarrow \theta_{t-1} - \alpha \cdot \tilde{g}$, where $\alpha > 0$ is the learning rate and $\tilde{g}$ denotes the Gaussian perturbed gradient (cf. Definition 2). After T update steps, where each update step itself an application of $\mathcal{M}_{Gau}(f_\theta(\cdot)$, the algorithm outputs a differentially private weight matrix $\theta$ which is then used in the prediction function. $f_{nn}(\cdot)$. Considering the evaluation of $f_{nn}(\cdot)$ given $(x, y) \in \mathcal{D}$ as post-processing of the trained weights $\theta$, it is found that prediction $\hat{y}=f_{nn}(x)$ is $(\in, \delta)$ differentially private too.

It is assumed that $\mathcal{A}_{adapt}$ desires to correctly identify the dataset that was utilized for training when having the choice between $\mathcal{D}$ and $\mathcal{D}'$. There are two variations of DP: bounded and unbounded. In bounded DP, it holds that $|\mathcal{D}|=|\mathcal{D}'|$. However, differentially private deep learning optimizers such as the one utilized herein consider unbounded DP as the standard case in which $|\mathcal{D}|-|\mathcal{D}'|=1$. Furthermore, it can be assumed that $\mathcal{A}_{adapt}$ to possess the following information: the initial weights $\theta_0$, the perturbed gradients $\tilde{g}$ after every epoch, the values of privacy parameters $(\in, \delta)$, and sensitivity $\Delta f_2=C$ equal to the clipping norm. Here, $\Delta f_2$ refers to the sensitivity with which noise added by a mechanism is scaled, not necessarily global sensitivity. In some experiments, for example, $\Delta f_2=S(f)$, which expresses the true difference between $f(\mathcal{D})$ and $f(\mathcal{D}')$, as in Definition 3. The assumptions are analogous to those of white-box membership inference attacks. The attack itself is based on calculating clipped gradients $\hat{g}(\mathcal{D}, \theta_t)$ and $\hat{g}(\mathcal{D}', \theta_t)$ for each training step $t \in T$, and finding $\beta(\mathcal{D})$ for that training step given and calculating $\theta_{t+1}$ by applying $\tilde{g}$.

Above, sensitivity was set to $\Delta f_2=S(f)=\|f(\mathcal{D})-f(\mathcal{D}')\|_2$, the true difference between the sums of wages resulting from Bob's and Dan's participation in a survey. In order to create a comparable experiment for differentially private deep learning, the difference between gradients that can be obscured by noise for each epoch is $S(f_{0_t})=\|n \cdot \hat{g}(\mathcal{D}, \theta_t)-(n-1) \cdot \hat{g}(\mathcal{D}', \theta_t)\|_2$. C bounds the influence of a single training example on training by clipping each per-example gradient to the chosen value of C; although this value bounds the influence of a single example on the gradient, this bound is loose. If $S(f_{\theta_t}<<$ [OBJ] C, adversary confidence $\beta(\mathcal{D})$ would be very small in every case when $\Delta f_2=C$, as is the case in most implementations of differentially private neural networks. This behavior is due to the fact that an assumption for Equation (4) does not hold, since $\Delta f_2 \neq$ [OBJ] $S(f_{\theta_t})$. To address this challenge in differentially private deep learning, $\Delta f_2=S(f_{0_t})$ can be adaptively set. Choosing $\Delta f_2$ this way is analogous to using local sensitivity in differential privacy.

---

Algorithm 2 Strong Adaptive Adversary in Deep Learning

---

Require: Datasets $\mathcal{D}$ and $\mathcal{D}'$ with n and n-1 records $\mathcal{D}_i$ and $\mathcal{D}'_i$, respectively, training steps T, cost function $J(\theta)$, perturbed gradients $\tilde{g}_t$ for each training step $t \leq T$, initial weights $\theta_0$, prior beliefs $\beta_0(\mathcal{D}) = \beta_0(\mathcal{D}') = 0.5$, learning rate $\alpha$, clipping threshold C, and mechanism $\mathcal{M}$ Ensure: Adversary Confidence $\beta_T(\mathcal{D})$ for $t \in [T]$ do Compute gradients For each $i \in \mathcal{D}, \mathcal{D}'$, compute $g_t(\mathcal{D}_i) \leftarrow \nabla_{\theta_t} J(\theta_t, \mathcal{D}_i)$ and $g_t(\mathcal{D}'_i) \leftarrow \nabla_{\theta_t} J(\theta_t, \mathcal{D}'_i)$ Clip gradients Clip each $g_t(\mathcal{D}_i)$, $g_t(\mathcal{D}'_i)$ for $i \in \mathcal{D}, \mathcal{D}'$ to have a maximum $L^2$ norm C using $$\bar{g}_t(\mathcal{D}_i) \leftarrow g_t(\mathcal{D}_i)/\max\left(1, \frac{\|g_t(\mathcal{D}_i)\|_2}{c}\right) \text{ and}$$

$$\bar{g}_t(\mathcal{D}'_i) \leftarrow g_t(\mathcal{D}'_i)/\max\left(1, \frac{\|g_t(\mathcal{D}'_i)\|_2}{c}\right)$$

Calculate Batch gradients $\hat{g}_t(\mathcal{D}) \leftarrow \mathrm{avg}(\bar{g}_t(\mathcal{D}_i))$ $\hat{g}_t(\mathcal{D}') \leftarrow \mathrm{avg}(\bar{g}_t(\mathcal{D}'_i))$ Calculate Sensitivity $\Delta f_t \leftarrow n \cdot \|n \cdot \hat{g}_t(\mathcal{D}') - (n-1) \cdot \hat{g}_t(\mathcal{D})\|_2$ Calculate Belief $$\beta_{t+1}(\mathcal{D}) \leftarrow \frac{\beta_t(\mathcal{D}) * \Pr[\mathcal{M}(\hat{g}_t(\mathcal{D})) = \tilde{g}_t]}{\beta_t(\mathcal{D}) * \Pr[\mathcal{M}(\hat{g}_t(\mathcal{D})) = \tilde{g}_t] + \beta_t(\mathcal{D}') * \Pr[\mathcal{M}(\hat{g}_t(\mathcal{D}')) = \tilde{g}_t]}$$

Compute weights $\theta_{t+1} \leftarrow \theta_t - \alpha \tilde{g}_t$ end for

---

Based on the previously introduced assumptions and notations Algorithm 1 can be adapted to be bounded and unbounded, as well as global and $S(f_\theta)$-based, settings. The adapted Strong Adaptive Adversary for differentially private deep learning is stated in Algorithm 2 specifies $\mathcal{A}_{adapt}$ in an unbounded environment with $\Delta f_2=S(f_\theta)$. For bounded differential privacy with $\Delta f_2=S(f_\theta)$, Algorithm 2 can be adjusted, s.t. $\mathcal{D}'$ is defined to contain n records, and $\Delta f_2=S(f_\theta)=n \cdot \|\hat{g}_t(\mathcal{D}')-\hat{g}_t(\mathcal{D})\|_2$. To implement global unbounded differential privacy, $\Delta f_2=C$ and $\mathcal{D}'$ contains n−1 records. To implement global bounded differential privacy, D' contains n−1 records and $\Delta f_2=2C$, since the maximum influence of one example on the sum of per-example gradients is C. If one record is replaced with another, the lengths of the clipped gradients of these two records could each be C and point in opposite directions, which results in $n \cdot \|\hat{g}_t(\mathcal{D}')-n \cdot \|\hat{g}_t(\mathcal{D}')\|_2=2C$. It is also noted that the same value of $\Delta f_2$ used by $\mathcal{A}_{adapt}$ can also be used by $\mathcal{M}$ to add noise.

For practical evaluation a feed-forward NN for the MNIST dataset was built. For MNIST the utilized NN architecture consists of two repetitions of a convolutional layer with kernel size (3, 3), batch normalization and max pooling with pool size (2, 2) before being flattened for the output layer. Relu and softmax activation functions were used for the convolutional layers and the output layer, respectively.

One epoch represents the evaluation of all records in $\mathcal{D}$. Thus, it is important to highlight that the number of update steps T varies in practice depending on the number of records from $\mathcal{D}$ used for calculating the DP gradient update $\hat{g}$. In mini-batch gradient descent a number of b records from $\mathcal{D}$ is used for calculating an update and one epoch results in $1=\mathcal{D}/b$ update steps. In contrast in batch gradient descent, all records in $\mathcal{D}$ are used for calculating the update and each epoch consists of a single update step. While the approaches vary in their speed of convergence due to the gradient update behavior (i.e., many small updates vs. few large updates) none of the approaches has hard limitations w.r.t. convergence of accuracy and loss. With the current subject matter, batch gradient descent was utilized and given differentially private gradient updates $\tilde{g}$ after any update step/the previously introduced adversary $\mathcal{A}_{adapt}$ shall decide whether it was calculated on $\mathcal{D}$ or $\mathcal{D}'$. It was assumed that $\mathcal{A}_{adapt}$ has equal prior beliefs of 0.5 on $\mathcal{D}$ and $\mathcal{D}'$. The prior belief of $\mathcal{A}_{adapt}$ adapts at every step t according to (1).

In the experiments, relevant parameters were set as follows: training data $|\mathcal{D}|=100$, epochs k=30, clipping norm C=3.0, learning rate $\alpha=0.005$, 5=0.01, and $\rho_c=0.9$. These values correspond to $\rho_\alpha=25.62\%$.

TABLE 5

| | Empirical $(\rho_\alpha, \delta)$ | |
|---|---|---|
| | $\Delta f_2 = S(f_\theta)$ | Global $\Delta f_2$ |
| Bounded DP | (0.240, 0.002) | (0.108, 0) |
| Unbounded DP | (0.250, 0.001) | 0.266, 0.001 |

Figure 8:
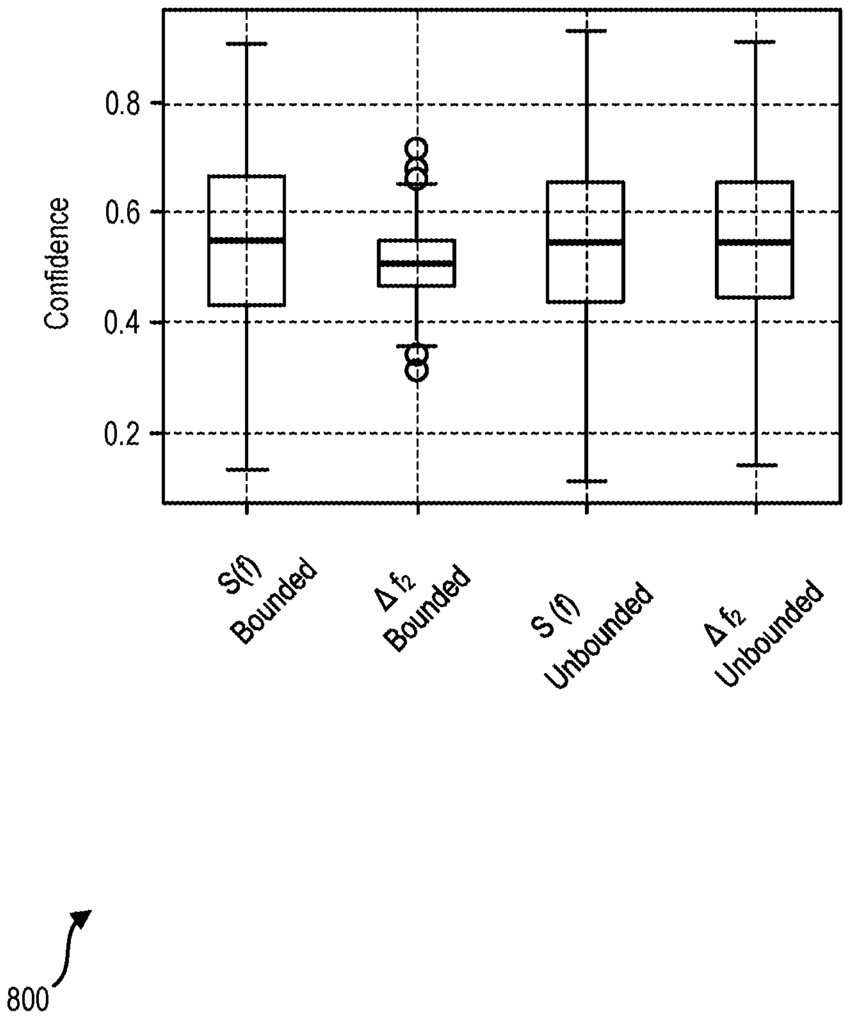
FIG. 8 is a diagram illustrating confidence distribution after 30 epochs with privacy parameters $\rho_c$=0.9, $\delta$=0.01.

The empirically calculated values (i.e., after the training) for $\rho_\alpha$ and $\delta$ are presented in Table 5. The belief distributions for the described experiments can be found in diagrams 700, 800 of FIGS. 7-8.

Figure 9A:
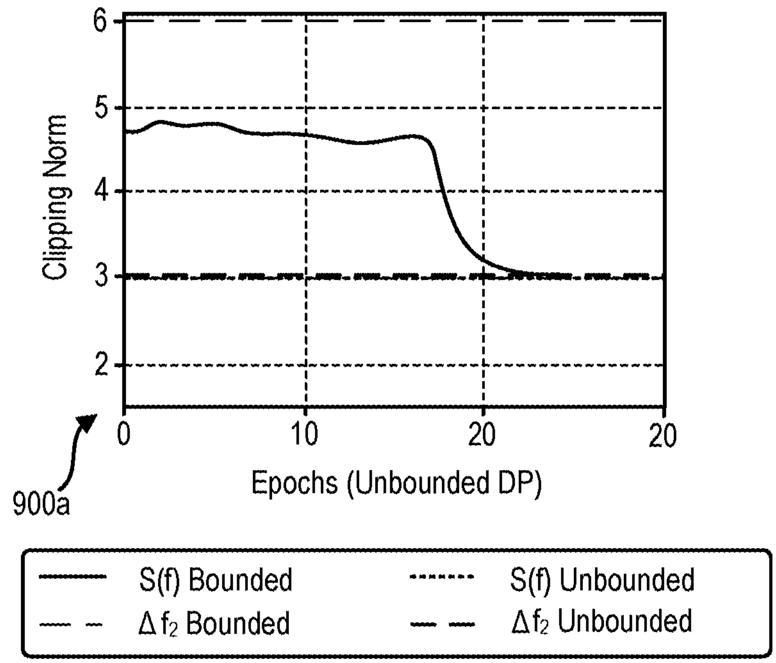
FIG. 9A-9B is a diagram illustrating sensitivity and test accuracy over 30 epochs.

Note that $\delta$ indeed bounds the percentage of experiments for which $\beta_T(\mathcal{D})>\rho_c$. For all experiments with $\Delta f_2=S(f_\theta)$ and for global, unbounded DP, the empirical and analytical values of $\rho_\alpha$ match the empirical values. However, in global, bounded differential privacy the difference of correct guesses and incorrect guesses by $\mathcal{A}_{adapt}$ falls below $\rho_\alpha$. In this experiment, the percentage of experiments for which $\beta_T(\mathcal{D})>\rho_c$ is also far lower. This behavior confirms the hypothesis that C is loose, so global sensitivity results in a lower value of $\beta_T(\mathcal{D})$, as is again confirmed by FIGS. 7*b* and 9*a*. It is also noted that the distributions in FIGS. 7*a* and 7*c* look identical to each other and to the distributions in FIG. 6 for the respective values of $\rho_c$ and $\delta$. This observation confirms that the strong adaptive adversary attack model is applicable to choose privacy parameter e in deep learning.

The following investigates the reason for the similarities between unbounded differential privacy with $\Delta f_2=S(f_\theta)$ and $\Delta f_2=C$ and also for the differences between FIGS. 7(*a*) and 7(*b*) concerning bounded differential privacy with $\Delta f_2=S(f_\theta)$ and $\Delta f_2=2C$. In the unbounded case, the distributions seem identical in diagram 800 of FIG. 8, which occurs when $\Delta f_2=S(f_\theta)=\|(n-1)\cdot\hat{g}_t(\mathcal{D}')-n\cdot\hat{g}_t(\mathcal{D})\|_2=C$, so the clipped per example gradient of the differentiating example in $\mathcal{D}$ should have the length 3, which is equal to C. This hypothesis is confirmed with a glance at the development of $\|(n-1)\cdot\hat{g}_t(\mathcal{D}')-\cdot\hat{g}_t(\mathcal{D})\|_2$ in diagram 900*a* of FIG. 9. This behavior is not surprising, since all per example gradients over the course of all epochs were greater than or close to C=3. In the bounded differential privacy experiments, $\Delta f_2=S(f_\theta)=n\cdot\|\hat{g}_t(\mathcal{D}')-\hat{g}_t(\mathcal{D})\|_2\neq 2C$, since the corresponding distributions in FIGS. 7(*a*) and 7(*b*), as well as FIG. 8, do not look identical. This expectation is confirmed by the plot of $n\cdot\|\hat{g}_t(\mathcal{D}')-\hat{g}_t(\mathcal{D})\|_2$ in FIG. 9(*a*). This difference implies that the per example gradients of the differentiating examples in $\mathcal{D}'$ and $\mathcal{D}$ are less than 2C and do not point in opposite directions. It is also noted that the length of gradients tends to decrease over the course of training, a trend that can be observed in diagram 900*a* of FIG. 9(*a*), so if training converges to a point in which gradients are shorter than the chosen value of C, globally differentially private deep learning inherently offers a stronger privacy guarantee than was originally chosen.

Figure 9B:
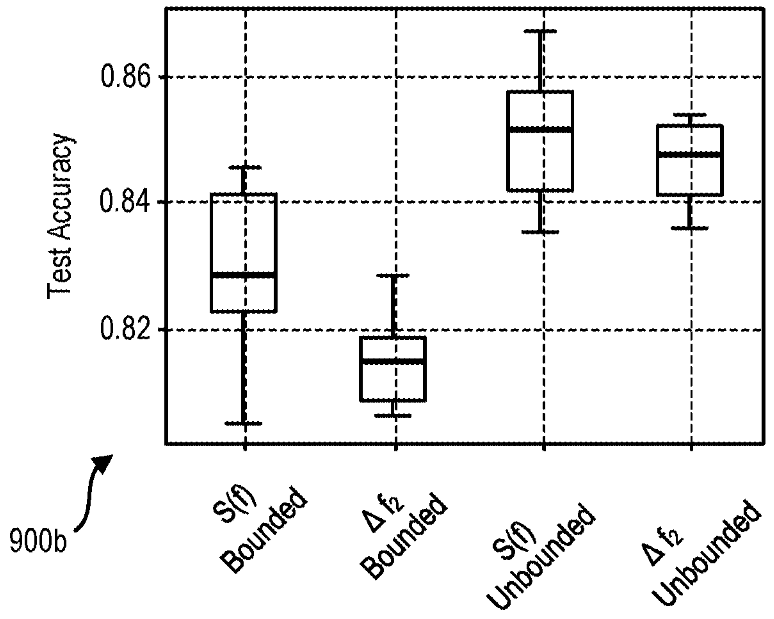

Diagram 900(*b*) of FIG. 9(*b*) confirms that the differentially trained models in these models do, indeed, yield some utility. It was also observed that test accuracy is directly affected by the value of sensitivity $\Delta f_2$ chosen for noise addition. Since gradients in all four scenarios are clipped to the same value of <C, the only differences between training the neural networks is $\Delta f_2$. As visualized in FIG. 9(*a*), sensitivities for unbounded DP with $\Delta f_2=S(f_\theta)$ and $\Delta f_2=C$ were identical, so the nearly identical corresponding distributions in FIG. 9(*b*) do not come as a surprise.

Similarly, it is observed that $\Delta f_2$ is greater for global, bounded DP in FIG. 9(*a*), so utility is also lower for this case in FIG. 9(*b*). The unbounded DP case with $\Delta f_2=S(f_\theta)$ yields the highest utility, which can be explained by the low value of $\Delta f_2$ that can be read from FIG. 9(*b*).

Relation to Membership Inference Threat Model. The membership inference threat model and the analysis of $\mathcal{A}_{adapt}$ herein exhibit clear commonalities. Namely, they exhibit the same overarching goal: to intuitively quantify the privacy offered by DP in a deep learning scenario. Both approaches aim to clarify the privacy risks associated with deep learning models.

Considering that $\mathcal{A}_{adapt}$ desires to identify the dataset used for training a NN, $\mathcal{A}_{adapt}$ is analogous to a membership inference adversary who desires to identify individual records in the training data. Furthermore, parallel to membership inference, $\mathcal{A}_{adapt}$ operates in the whitebox model, observing the development of $\tilde{g}_t$ over all training steps t of a NN. In one approach, the adversary uses the training loss to infer membership of an example.

Although the general ideas overlap, $\mathcal{A}_{adapt}$ is far stronger than a membership inference adversary. Membership advantage quantifies the effectiveness of the practical membership inference attack and therefore provides a lower bound on information leakage, which adversaries with auxiliary information quickly surpass. $\mathcal{A}_{adapt}$ has access to arbitrary auxiliary information, including all data points in $\mathcal{D}$ and $\mathcal{D}'$, staying closer to the original DP guarantees. Using $\mathcal{A}_{adapt}$, what the best possible adversary is able to infer can be calculated and it can be seen that this adversary reaches the upper bound.

An adversarial game can be defined in which the adversary receives both datasets $\mathcal{D}$ and $\mathcal{D}'$ instead of only receiving one value z, the size n of the dataset, and the distribution from which the data points are drawn.

Experiment 1. Let $\mathcal{A}$ be an adversary, A be a learning algorithm, $\mathcal{D}$ and $\mathcal{D}'$be neighboring datasets. The identifiability experiment proceeds as follows:

1. Choose $b \leftarrow \{0, 1\}$ uniformly at random
2 Let $\mathcal{A}_{\mathcal{D}} = \mathcal{A}(\mathcal{D})$ if b=0 and $\mathcal{A}_{\mathcal{D}} = \mathcal{A}(\mathcal{D}')$ if b=1
3. Output 1 if $\mathcal{A}(\mathcal{D}, \mathcal{D}', \mathcal{A}_{\mathcal{D}}) = 0$, 0 otherwise. $\mathcal{A}$ outputs 0 or 1.

Here, the expected value of membership advantage to quantify the accuracy of $\mathcal{A}_{adapt}$ is calculated.

In the evaluation of $\mathcal{A}_{adapt}$ in a deep learning setting, it was realized that $\mathcal{A}_{adapt}$ did not reach the upper confidence bound until the sensitivity was adjusted. In differentially private deep learning, gradients decrease over the course of training until convergence and can fall below the sensitivity or clipping norm. This means that more noise is added than would have been necessary to obscure the difference made by a member of the dataset. Overall, the difference between the lower bound on privacy offered by membership advantage in a membership inference setting and the upper bound offered by maximum adversary confidence includes the auxiliary knowledge of $\mathcal{A}_{adapt}$ and the inherent privacy offered in deep learning scenarios through decreasing gradients.

Application To Analytics. The observed utility gains can also be realized on real-world data in an energy forecasting task that is relevant for German energy providers. In this energy forecasting problem, the energy transmission network is structured into disjoint virtual balancing groups under the responsibility of individual energy providers. Each balancing group consist of multiple zones and each zone consists of individual households. Energy providers have an incentive to forecast the demand in their balancing group with low error to schedule energy production accordingly. Currently, energy providers can utilize the overall aggregated energy consumption per balancing group to calculate a demand forecast, since they have to report these number to the transmission system operator. However, with the rollout of smart meters additional communication channels can be set up and the demand per zone could be computed. Note that, counterintuitively, forecasting on grouped household loads instead of individual households is beneficial for forecasting performance due to reduced stochasticity. Nonetheless, computing the demand per zone is reflecting the sum of individual household energy consumption and thus a sensitive task. Here, the use of differential privacy allows one to compute the anonymized energy consumption per zone and mitigate privacy concerns. The energy provider will only have an incentive to apply differential privacy, if the forecasting error based on differentially private energy consumption per zone is lower than the forecasting error based on the aggregated zonal loads. Vice versa the energy provider has to quantify and communicate the achieved privacy guarantee to the balancing group households to gather consent for processing the data.

This forecasting task was based on the dataset and benchmarking model of the 2012 Global Energy Forecast Competition (GEFCom). The GEFCom dataset consists of hourly energy consumption data of 4.5 years from 20 zones for training and one week of data from the same zones for testing. The GEFCom winning model computes the Forecast/for a zone: at time t by computing a linear regression over a p dimensional feature vector x (representing 11 weather stations):

$$F_{z,t} = \beta_0 + \sum_{j=1}^{p} \beta_j \cdot x_{t,j} + e_t. \tag{18}$$

The sensitive target attribute of the linear regression is zonal load consumption $L_z$,t, e.g., the sum of n household loads $l_z$,t,i, . . . , n. Differential privacy can be added to the sum computation by applying the Gaussian mechanism (cf. 2) yielding:

$$L_{z,t'} = \sum_{i=1}^{n_z} l_{z,i,t'} + \mathcal{N}(0, \sigma^2)). \tag{19}$$

The energy provider will only have a benefit if the differentially private load forecasting is having a smaller error than the aggregated forecast. A suited error metric for energy forecasting is the Mean Absolute Error (MAE), i.e.:

$$MAE = \frac{1}{T} \sum_{t=1}^{T} |F_t - L_t|. \tag{20}$$

Figure 10A:
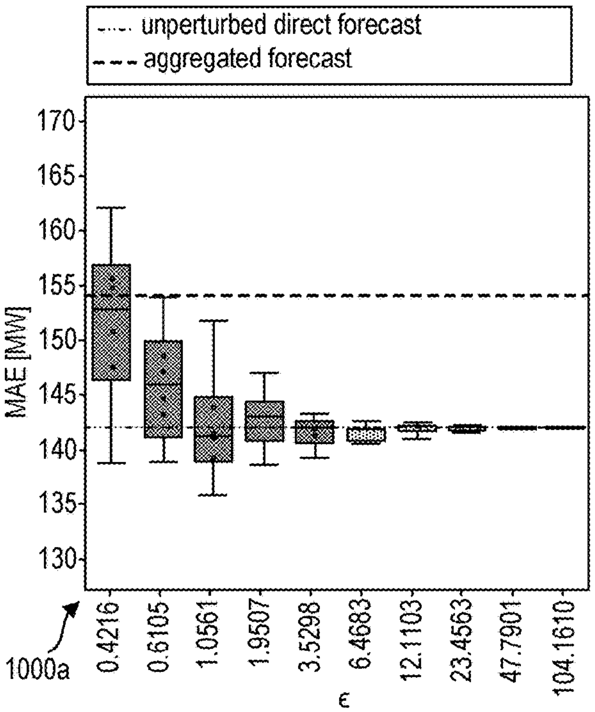
FIG. 10A-10C are diagrams illustrating utility and privacy metrics for the GEFcom challenge.
Figure 10B:
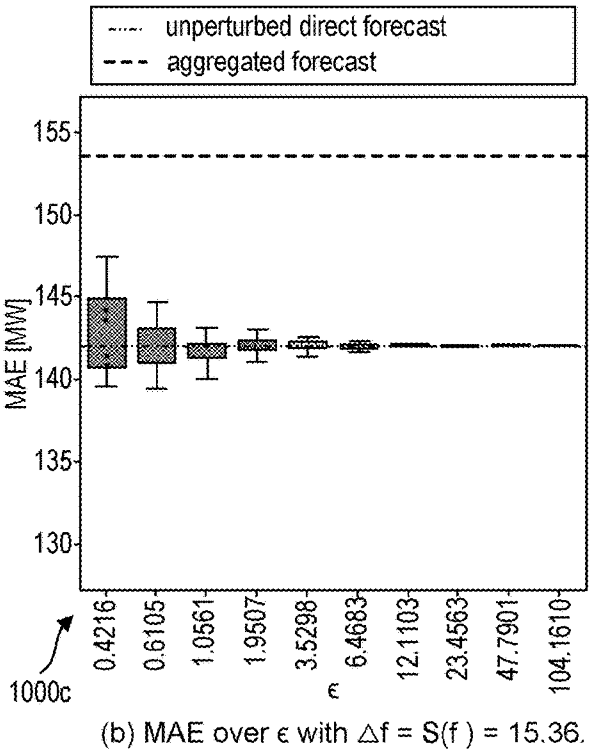
Figure 10C:
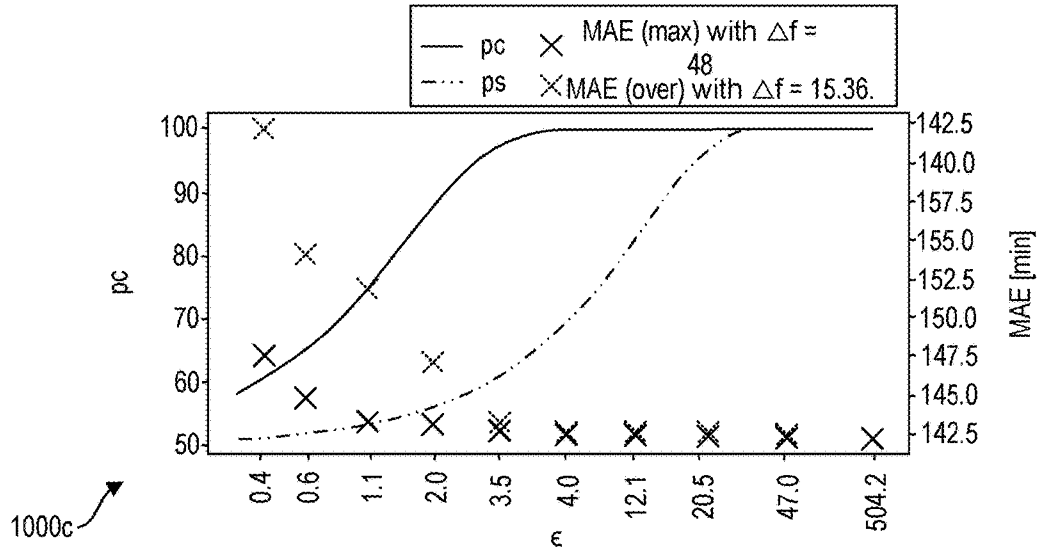

Diagram 1000*a* of FIG. 10(*a*) illustrates that the forecasting error over 10 independent forecast trainings over increasing privacy parameters E. Note that this illustration was limited to $\in <0.4216$ since the forecasting error is already exceeding the aggregate forecast error for this $\in$ and continues to increase afterwards. Thus, from a utility perspective the energy provider will have a preference for $\in >>0.4216$. The privacy loss is again analyzed over composition (k=38, 070) with RDP for an additive privacy loss $\delta=10^{-9}$ and a global sensitivity of $\Delta f=48$ kW which is the maximum technical power demand fused in German residential homes. However, in practice households have been observed not to exceed power consumptions of up to 15.36 kW, which thus is used as an estimate for $S(f)$.

FIG. 10(*b*) illustrates the corresponding MAE when applying the Gaussian mechanism with $\Delta f=S(f)=15.36$. Note that for both Gaussian mechanisms noise is sampled from a Gaussian distribution with $\sigma=\eta z \cdot \Delta f$, and that was used an equal z for both Gaussian mechanisms. FIG. 10 illustrates that the achievable utility is consistently higher.

In contrast to the energy provider, it is assumed that households have an interest in $\rho_c \ll 1$. This leads to the question whether the energy provider and the households have a intersection of their preferred $\in$. FIG. 10(*c*) maps $\rho_c$ and $\rho_\alpha$ to MAE over $\in$ for $\delta=10^{-9}$ and either $\Delta f=48$ or $\Delta f=S(f)=15.36$. It is observed for $\rho_c\approx0.65$, which results in $\in\approx0.6$ and $\rho_a\approx0.04$, that the use of $S(f)$ instead of global sensitivity allows to reduce the maximum MAE by approximately 10 MW, which is significant when considering that the absolute difference between the aggregated forecast MAE and unperturbed forecast MAE is only ≈12 MW.

Figure 11:
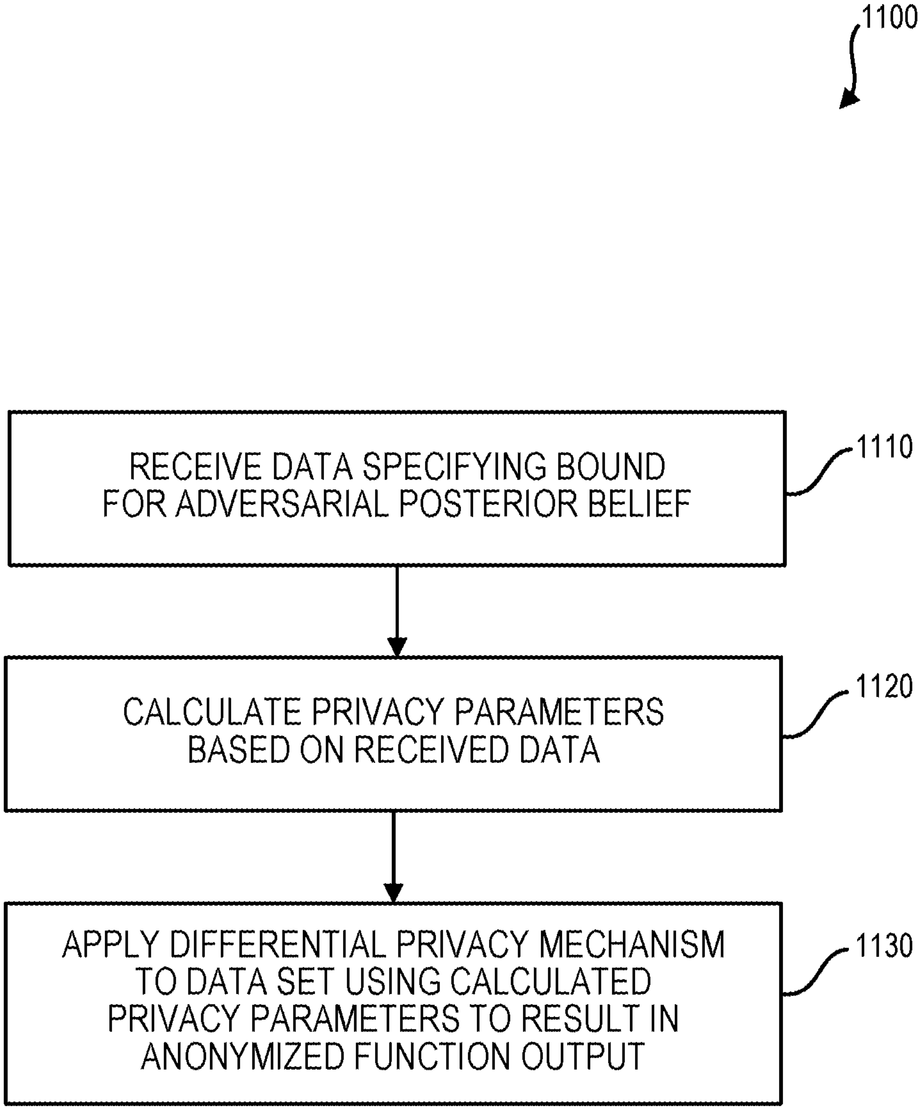
FIG. 11 is a first process flow diagram illustrating an interpretability framework for differential private deep learning.

FIG. 11 is a process flow diagram 1100 in which, at 1110, data is received that specifies a bound for an adversarial posterior belief $\rho_c$ that corresponds to a likelihood to re-identify data points from the dataset based on a differentially private function output. Privacy parameters ε, δ are then calculated, at 1120, based on the received data that govern a differential privacy (DP) algorithm to be applied to a function to be evaluated over a dataset. The calculating is based on a ratio of probabilities distributions of different observations, which are bound by the posterior belief $\rho_c$ as applied to a dataset. The calculated privacy parameters are then used, at 1130, to apply the DP algorithm to the function over the dataset to result in an anonymized function output (e.g., a machine learning model, etc.).

Figure 12:
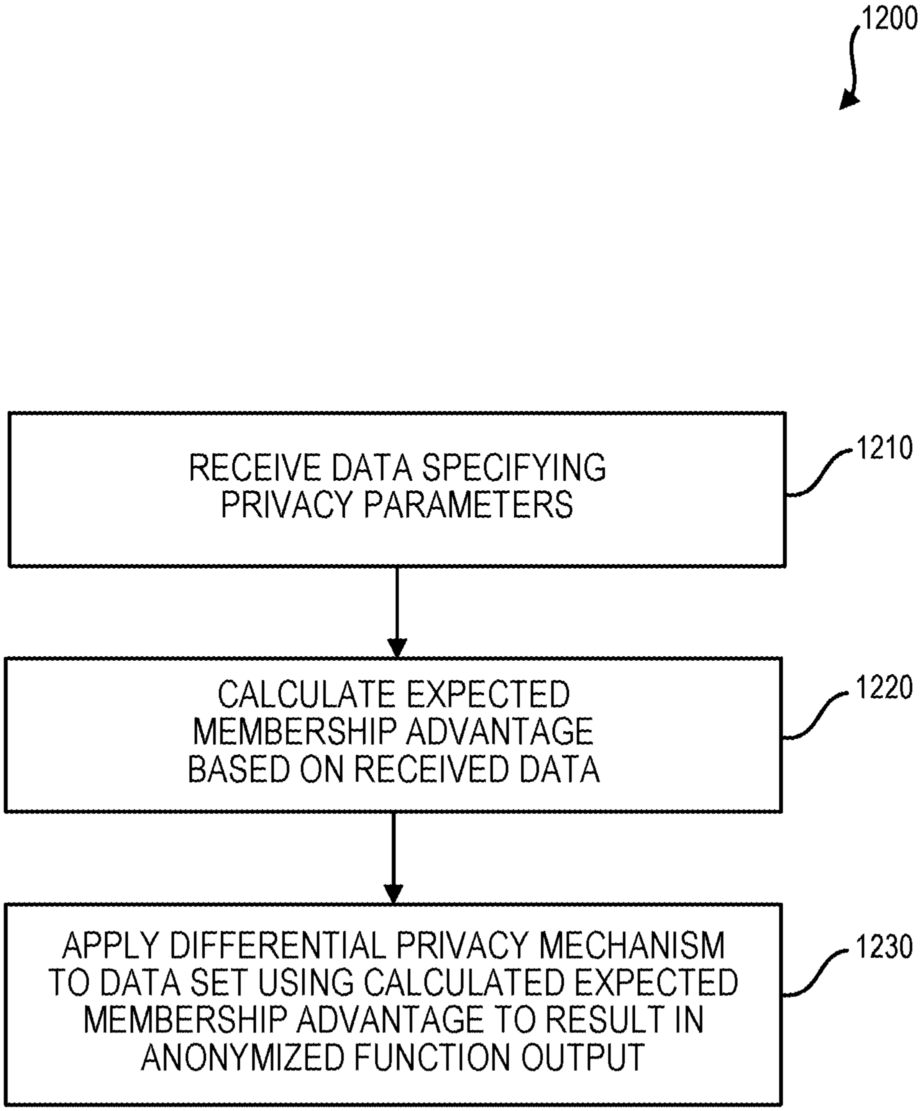
FIG. 12 is a second process flow diagram illustrating an interpretability framework for differential private deep learning.

FIG. 12 is a process flow diagram 1200 in which, at 1210, data is received that specifies privacy parameters ε, δ which govern a differential privacy (DP) algorithm to be applied to a function to be evaluated over a dataset. The received data is then used, at 1220, to calculate an expected membership advantage $\rho_\alpha$ that corresponds to a likelihood of an adversary successfully identifying a member in the dataset. Such calculating can be based on an overlap of two probability distributions. The calculated expected membership advantage $\rho_\alpha$ can be used, at 1230, when applying the DP algorithm to a function over the dataset to result in an anonymized function output (e.g., a machine learning model, etc.).

Figure 13:
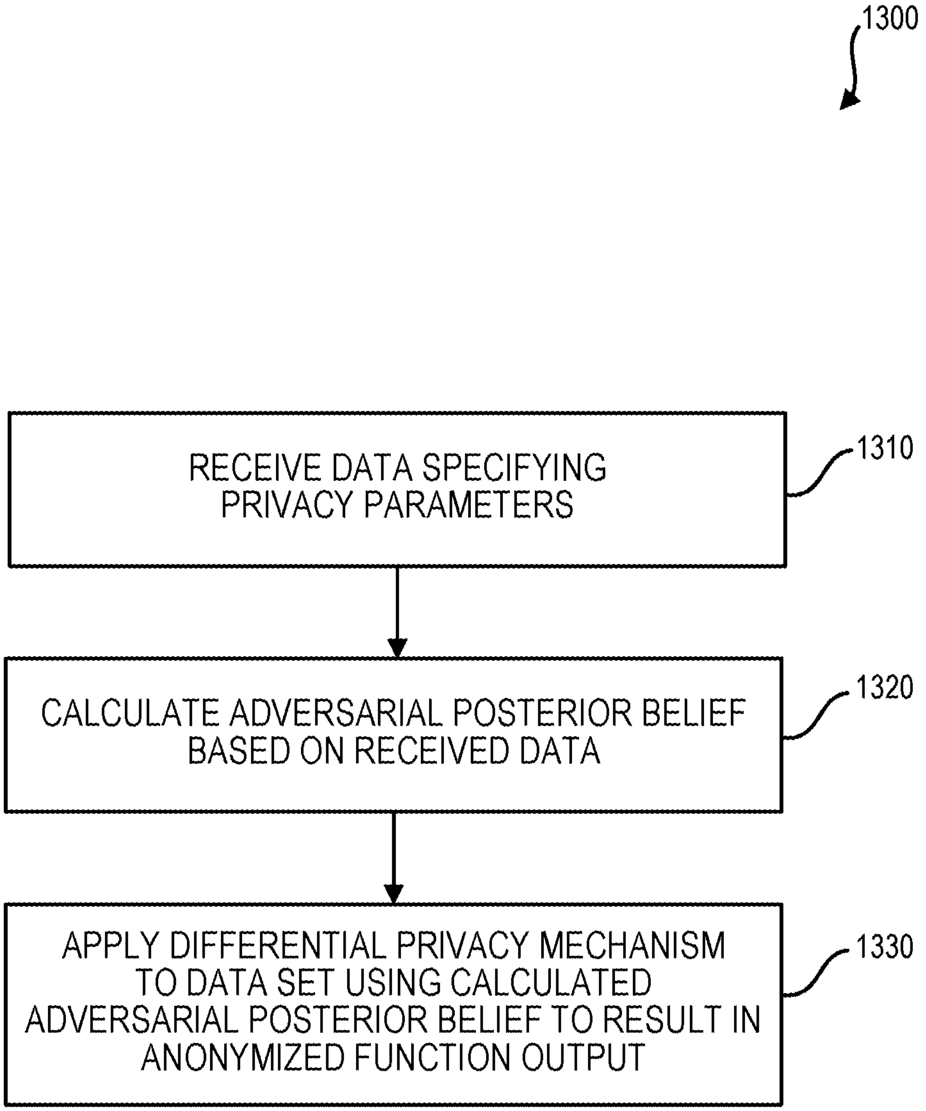
FIG. 13 is a third process flow diagram illustrating an interpretability framework for differential private deep learning.

FIG. 13 is a process flow diagram 1300 in which, at 1310, data is received that specifies privacy parameters ε, δ which govern a differential privacy (DP) algorithm to be applied to a function to be evaluated over a dataset. Thereafter, at 1320, the received data is used to calculate an adversarial posterior belief bound $\rho_c$ that $\rho_c$[OBJ], to a function over the dataset to result in an anonymized function output (e.g., machine learning model, etc.).

Figure 14:
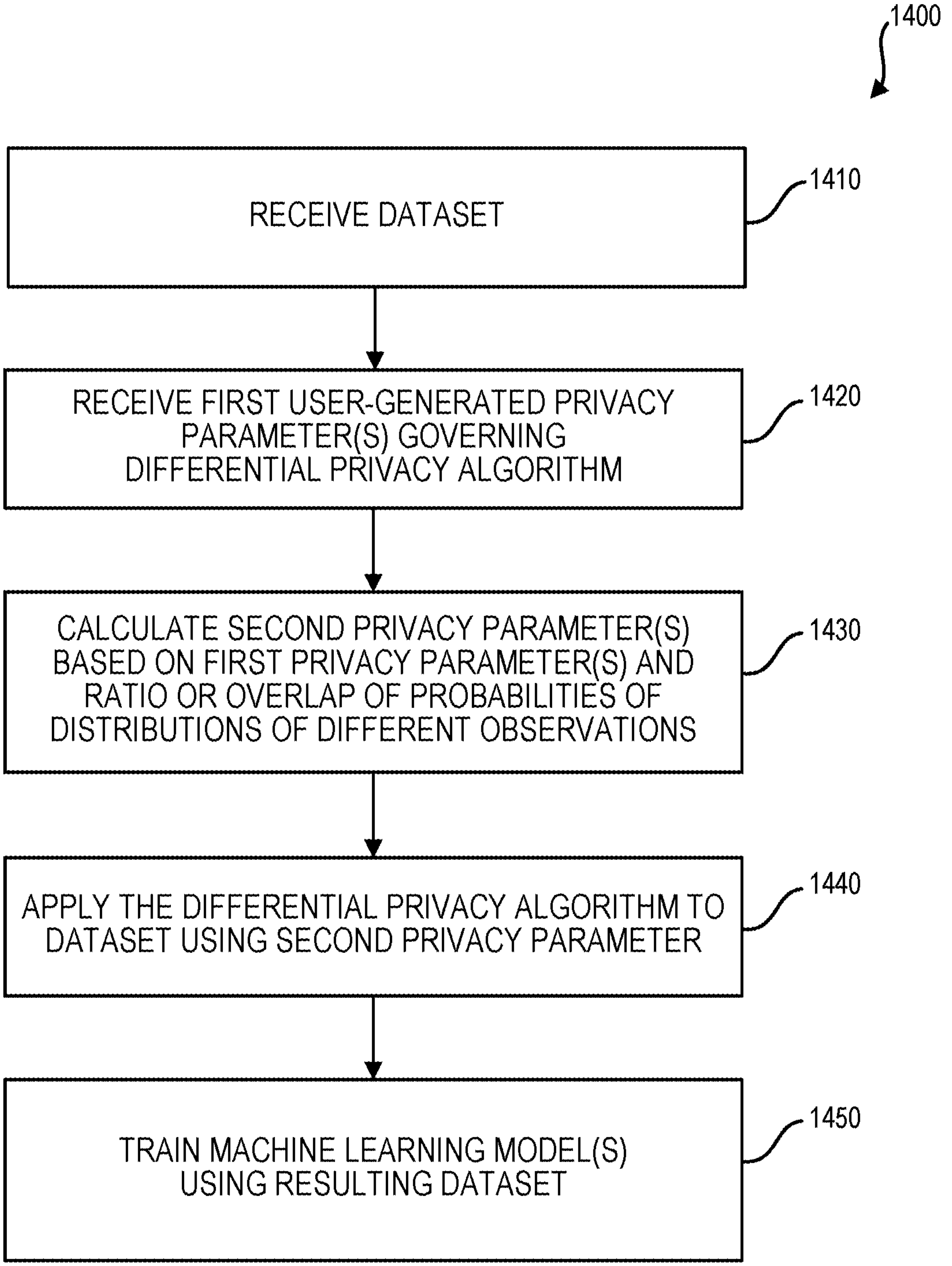
FIG. 14 is a fourth process flow diagram illustrating an interpretability framework for differential private deep learning.

FIG. 14 is a process flow diagram in which, at 1410, a dataset is received. Thereafter, at 1420, at least one first user-generated privacy parameter is received which governs a differential privacy (DP) algorithm to be applied to a function evaluated over the received dataset. Using the received at least one first user-generated privacy parameter, at least one second privacy parameter is calculated, at 1430, based on a ratio or overlap of probabilities of distributions of different observations. Subsequently, at 1440, the DP algorithm is applied, using the at least one second privacy parameter, to the function over the received dataset. At least one machine learning model can be trained, at 1450, using the dataset which, when deployed, is configured to classify input data.

The machine learning model(s) can be deployed once trained to classify input data when received.

The at least one first user-generated privacy parameter can include a bound for an adversarial posterior belief $\rho_c$ that corresponds to a likelihood to re-identify data points from the dataset based on a differentially private function output. With such an arrangement, the calculated at least one second privacy parameter can include privacy parameters ε, δ and the calculating can be based on $\rho_c$ which are bound by the posterior belief $\rho_c$ as applied to the dataset.

In another variation, the at least one first user-generated privacy parameter includes privacy parameters ε, δ. With such an implementation, the calculated at least one second privacy parameter can include an expected membership advantage $\rho_\alpha$ that corresponds to a likelihood of an adversary successfully identifying a member in the dataset and the calculating can be based on an overlap of two probability distributions.

In still another variation, the at least one first user-generated privacy parameter can include privacy parameters ε, δ. With such an implementation, the calculated at least one second privacy parameter can include an adversarial posterior belief bound $\rho_c$ that corresponds to a likelihood to re-identify data points from the dataset based on a differentially private function output and the calculating can be based on a conditional probability of different possible datasets.

Figure 15:
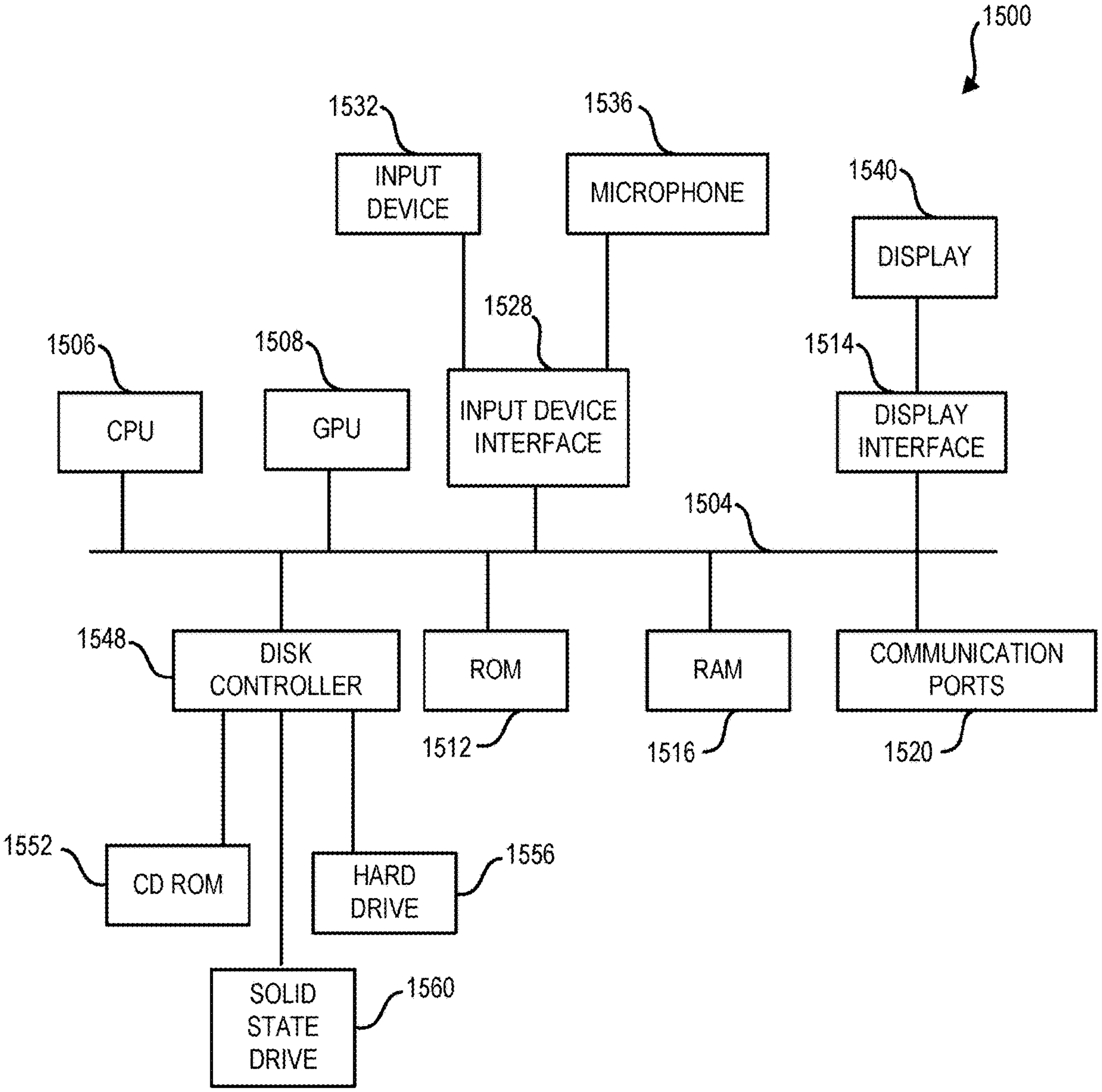
FIG. 15 is a diagram of a computing device for implementing aspects of an interpretability framework for differential private deep learning.

FIG. 15 is a diagram 1500 illustrating a sample computing device architecture for implementing various aspects described herein. A bus 1504 can serve as the information highway interconnecting the other illustrated components of the hardware. A processing system 1508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1512 and random access memory (RAM) 1516, can be in communication with the processing system 1508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1548 can interface with one or more optional disk drives to the system bus 1504. These disk drives can be external or internal floppy disk drives such as 1560, external or internal CD-ROM, CD-R, CD-RW, or DVD, or solid state drives such as 1552, or external or internal hard drives 1556. As indicated previously, these various disk drives 1552, 1556, 1560 and disk controllers are optional devices. The system bus 1504 can also include at least one communication port 1520 to allow for communication with external devices either physically connected to the computing system or available externally through a wired or wireless network. In some cases, the at least one communication port 1520 includes or otherwise comprises a network interface.

To provide for interaction with a user, the subject matter described herein can be implemented on a computing device having a display device 1540 (e.g., a CRT (cathode ray tube) or LCD (liquid crystal display) monitor) for displaying information obtained from the bus 1504 via a display interface 1514 to the user and an input device 1532 such as keyboard and/or a pointing device (e.g., a mouse or a trackball) and/or a touchscreen by which the user can provide input to the computer. Other kinds of input devices 1532 can be used to provide for interaction with a user as well; for example, feedback provided to the user can be any form of sensory feedback (e.g., visual feedback, auditory feedback by way of a microphone 1536, or tactile feedback); and input from the user can be received in any form, including acoustic, speech, or tactile input. The input device 1532 and the microphone 1536 can be coupled to and convey information via the bus 1504 by way of an input device interface 1528. Other computing devices, such as dedicated servers, can omit one or more of the display 1540 and display interface 1514, the input device 1532, the microphone 1536, and input device interface 1528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for training a machine learning model comprising:
- at least one data processor;
- memory storing instructions which, when executed by the at least one data processor, result in operations comprising:
- receiving a dataset;
- receiving at least one first user-generated privacy parameter which governs a differential privacy (DP) algorithm to be applied to a function evaluated over the received dataset;
- calculating, based on the received at least one first user-generated privacy parameter, at least one second privacy parameter based on a ratio or overlap of probabilities of distributions of different observations;
- applying, using the at least one second privacy parameter, the DP algorithm to the function over the received dataset to result in an anonymized function output, the DP algorithm using the at least one second privacy parameter during execution of one or more steps involved in converting the received dataset into the anonymized function output; and
- anonymously training at least one machine learning model using the dataset after application of the DP algorithm to the function over the received dataset which, when deployed, is configured to classify input data.

2. The system of claim 1, wherein the operations further comprise:
- deploying the trained at least one machine learning model;
- receiving, by the deployed trained at least one machine learning model, input data.

3. The system of claim 2, wherein the operations further comprise:
- providing, by the deployed trained at least one machine learning model based on the input data, a classification.

4. The system of claim 1, wherein:
- the at least one first user-generated privacy parameter comprises a bound for an adversarial posterior belief $p_c$ that corresponds to a likelihood to re-identify data points from the dataset based on a differentially private function output; and
- the calculated at least one second privacy parameter comprises privacy parameters ε, δ; and
- the calculating is based on a conditional probability of distributions of different datasets given a differential private function output which are bound by the posterior belief $p_c$ as applied to the dataset.

5. The system of claim 1, wherein
the at least one first user-generated privacy parameter comprises privacy parameters ε, δ;
the calculated at least one second privacy parameter comprises an expected membership advantage $p_\alpha$ that corresponds to a probability of an adversary successfully identifying a member in the dataset; and
the calculating is based on a conditional probability of different possible datasets.

6. The system of claim 1, wherein
the at least one first user-generated privacy parameter comprises privacy parameters ε, δ;
the calculated at least one second privacy parameter comprises an adversarial posterior belief bound $p_c$ that corresponds to a likelihood to re-identify data points from the dataset based on a differentially private output.

7. The system of claim 6, wherein the calculating is based on a conditional probability of different possible datasets.

8. A method comprising:
receiving a dataset;
receiving at least one first user-generated privacy parameter which governs a differential privacy (DP) algorithm to be applied to a function evaluated over the received dataset;
calculating, based on the received at least one first user-generated privacy parameter, at least one second privacy parameter based on a ratio or overlap of probabilities of distributions of different observations;
applying, using the at least one second privacy parameter, the DP algorithm to the function over the received dataset to result in an anonymized function output, the DP algorithm using the at least one second privacy parameter during execution of one or more steps involved in converting the received dataset into the anonymized function output; and
anonymously training at least one machine learning model using the dataset after application of the DP algorithm to the function over the received dataset which, when deployed, is configured to classify input data.

9. The method of claim 8, further comprising:
deploying the trained at least one machine learning model;
receiving, by the deployed trained at least one machine learning model, input data.

10. The method of claim 9, further comprising:
providing, by the deployed trained at least one machine learning model based on the input data, a classification.

11. The method of claim 8, wherein:
the at least one first user-generated privacy parameter comprises a bound for an adversarial posterior belief $p_c$ that corresponds to a likelihood to re-identify data points from the dataset based on a differentially private function output; and
the calculated at least one second privacy parameter comprises privacy parameters ε, δ; and
the calculating is based on a conditional probability of distributions of different datasets given a differential private function output which are bound by the posterior belief $p_c$ as applied to the dataset.

12. The method of claim 8, wherein
the at least one first user-generated privacy parameter comprises privacy parameters ε, δ;
the calculated at least one second privacy parameter comprises an expected membership advantage $p_\alpha$ that corresponds to a probability of an adversary successfully identifying a member in the dataset; and
the calculating is based on a conditional probability of different possible datasets.

13. The method of claim 8, wherein
the at least one first user-generated privacy parameter comprises privacy parameters ε, δ;
the calculated at least one second privacy parameter comprises an adversarial posterior belief bound $p_c$ that corresponds to a likelihood to re-identify data points from the dataset based on a differentially private output.

14. The method of claim 13, wherein the calculating is based on a conditional probability of different possible datasets.

15. A non-transitory machine-readable storage medium having embodied thereon instructions executable by one or more machines to perform operations comprising:
receiving a dataset;
receiving at least one first user-generated privacy parameter which governs a differential privacy (DP) algorithm to be applied to a function evaluated over the received dataset;
calculating, based on the received at least one first user-generated privacy parameter, at least one second privacy parameter based on a ratio or overlap of probabilities of distributions of different observations;
applying, using the at least one second privacy parameter, the DP algorithm to the function over the received dataset to result in an anonymized function output, the DP algorithm using the at least one second privacy parameter during execution of one or more steps involved in converting the received dataset into the anonymized function output; and
anonymously training at least one machine learning model using the dataset after application of the DP algorithm to the function over the received dataset which, when deployed, is configured to classify input data.

16. The non-transitory machine-readable storage medium of claim 15, wherein the operations further comprise:
deploying the trained at least one machine learning model;
receiving, by the deployed trained at least one machine learning model, input data.

17. The non-transitory machine-readable storage medium of claim 16, wherein the operations further comprise:
providing, by the deployed trained at least one machine learning model based on the input data, a classification.

18. The non-transitory machine-readable storage medium of claim 15, wherein:
the at least one first user-generated privacy parameter comprises a bound for an adversarial posterior belief $p_c$ that corresponds to a likelihood to re-identify data points from the dataset based on a differentially private function output; and
the calculated at least one second privacy parameter comprises privacy parameters ε, δ; and
the calculating is based on a conditional probability of distributions of different datasets given a differential private function output which are bound by the posterior belief $p_c$ as applied to the dataset.

19. The non-transitory machine-readable storage medium of claim 15, wherein
the at least one first user-generated privacy parameter comprises privacy parameters ε, δ;
the calculated at least one second privacy parameter comprises an expected membership advantage $p_\alpha$ that corresponds to a probability of an adversary successfully identifying a member in the dataset; and the calculating is based on a conditional probability of different possible datasets.

20. The non-transitory machine-readable storage medium of claim 15, wherein the at least one first user-generated privacy parameter comprises privacy parameters ε, δ;

the calculated at least one second privacy parameter comprises an adversarial posterior belief bound $p_c$ that corresponds to a likelihood to re-identify data points from the dataset based on a differentially private output.

* * * * *